(12) United States Patent
Kaneko et al.

(10) Patent No.: US 6,344,930 B1
(45) Date of Patent: Feb. 5, 2002

(54) TOTAL-FOCUS IMAGING APPARATUS USING A VARIABLE-FOCUS LENS

(75) Inventors: Takashi Kaneko, Nagoya; Naoki Mitsumoto, Ichikawa; Nobuaki Kawahara, Nisshin, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/517,713

(22) Filed: Mar. 2, 2000

(30) Foreign Application Priority Data

Mar. 3, 1999 (JP) .......................................... 11-055680
Oct. 22, 1999 (JP) .......................................... 11-300467

(51) Int. Cl.[7] .............................................. G02B 1/06
(52) U.S. Cl. ...................................... 359/666; 359/820
(58) Field of Search ................................ 359/665, 666, 359/667, 820

(56) References Cited

U.S. PATENT DOCUMENTS

| 5,917,657 | A | 6/1999 | Kaneko et al. | ............. 359/665 |
| 6,188,526 | B1 | 2/2001 | Sasaya et al. | ............... 359/666 |

FOREIGN PATENT DOCUMENTS

| JP | 61-33638 | 2/1986 |
| JP | 61-157080 | 7/1986 |
| JP | 1-140118 | 6/1989 |
| JP | 1-162485 | 6/1989 |
| JP | 2-120986 | 5/1990 |
| JP | 5-227460 | 9/1993 |
| JP | 5-333271 | 12/1993 |
| JP | 8-114703 | 5/1996 |
| JP | 8-163423 | 6/1996 |
| JP | 9-15506 | 1/1997 |
| JP | 10-144975 | 5/1998 |
| JP | 10-200840 | 7/1998 |
| JP | 10-311711 | 11/1998 |
| JP | 11-113027 | 4/1999 |
| JP | 11-177873 | 7/1999 |

*Primary Examiner*—Scott J. Sugarman
(74) *Attorney, Agent, or Firm*—Law Office of David G. Posz

(57) ABSTRACT

A total-focus imaging apparatus comprises a variable-focus lens unit with a focal position thereof changeable at high speeds, a CCD element, a microcomputer and a liquid-crystal display unit. The microcomputer includes an image memory, an image processing circuit and a control circuit. The variable-focus lens unit and the CCD element allow an object of observation to be photographed to generate a number of images with the focal positions thereof slightly different from each other and the image to be stored in the image memory. Pixels each brought to a focus are selected by the image processing circuit from pixels of the images to generate an image of the observation object comprising only pixels each brought to a focus. Such an image is then displayed on the liquid-crystal display unit. Thus, an image of the observation object which is all but completely brought to a focus can be presented in a semi-real-time manner. An image of an observation object all but completely brought to a focus is an image with all portions of the observation object brought to a focus.

22 Claims, 21 Drawing Sheets

SMALL ENTROPY

LARGE ENTROPY f(X,y) LUMINANCE MATRIX

FIG. 17

FIRST STAGE

| (Z2) CAL2 | (Z3) CAL3 | (Z4) CAL4 |
|---|---|---|
| (Z5) CAL5 | (Z1) N PIXELS CAL1 | (Z6) CAL6 |
| (Z7) CAL7 | (Z8) CAL8 | (Z9) CAL9 |

FIG. 18

SECOND STAGE

| (Z2) CAL2 | (Z3) CAL3 | (Z4) CAL4 |
|---|---|---|
| (Z5) CAL5 | (Z1) NEW CAL | (Z6) CAL6 |
| (Z7) CAL7 | (Z8) CAL8 | (Z9) CAL9 |

FIG. 30

| | BLACK PIXEL | WHITE PIXEL |
|---|---|---|
| (A) | dMAX≠0, dMIN=0, OK | dMAX=0, dMIN≠0, OK |
| (B) | NG, dMAX=0, dMIN=0 | dMAX=0, dMIN=0, OK |

TOTAL-FOCUS IMAGING APPARATUS USING A VARIABLE-FOCUS LENS

CROSS REFERENCE TO RELATED APPLICATION

This application relates to and incorporates herein by reference Japanese Patent Applications No. 11-55680 filed on Mar. 3, 1999 and No. 11-300467 filed on Oct. 22, 1999.

BACKGROUND OF THE INVENTION

The present invention generally pertains to imaging apparatuses such as an optical microscope, an electron microscope, an optical telescope and an electronic camera. More particularly, the present invention pertains to a total focus imaging apparatus using a variable-focus lens.

As conventional technologies, the following focusing technologies are disclosed in JP-A-9-230252 (U.S. Pat. No. 5,917,657).

In one imaging technology, while the focal position relative to an object of observation is being moved back and forth at high speeds, that is, the distance from a lens to a focus plane is increased and decreased at high speeds, an image is displayed in real-time manner. This technology thus utilizes the fact that only a portion with a clear focused contour is visually recognized as a retina residual image. By utilizing a physiological residual-image phenomenon, this technology is capable of letting the observer visually recognize an image with the entire object of observation brought to a focus. Thus, this imaging technology is suitable for, among others, a case in which the object of observation is moving.

However, this technology also allows a blurring image not brought to a focus to be created on the retina as an image. In this case, an out-of-focus time is generally longer than an in-focus moment. Thus, this technology has a problem of providing the observer with a feeling to receive a slightly blurring image from the sense of sight. That is, with this technology, it is impossible to obtain an image with all portions of an observation object brought completely to a focus. The technology raises a problem of a slightly blurred feeling in the sense of sight and a problem of causing the eyes to get tired easily. There is also raised a problem that an image completely brought to focus can be merely recognized visually but such an image cannot be photographed and printed.

The second imaging technology is an application of the above imaging technology whereby two imaging apparatuses are directed to an object of observation at a parallax to display photographed images on the right and left eyes so as to allow the observer to see the object of observation with the two eyes. This second technology provides an effect of an ability to visually recognize an image giving a stereo sense to the observer in real-time manner.

However, the second technology has the same problems as the first imaging technology in that the second technology is not capable of presenting an image completely brought to a focus. In addition, since both the first and second imaging technologies are not capable of generating a stereo numerical model of an observation object, it is impossible to present an end-face diagram showing a cross-sectional shape and to display an image obtained as a result of a continuous synthesis of crane-shot images.

SUMMARY OF THE INVENTION

It is thus an object of the present invention to generate an image with all portions of an observation object brought to a focus in a semi-real-time manner and to allow an image to be displayed in a variety of display formats by generating a stereo numerical model showing a stereo shape of an observation object.

According to the present invention, a total-focus imaging apparatus is constructed with a variable-focus lens, an actuator for the lens, an image-pickup device, an image memory for storing image signals produced from the image-pickup device, and an image processing circuit for determining an image signal most brought to a focus thereby to determine either an image with all portions of an observation object or a stereo numerical model showing a stereo shape of the observation object.

Preferably, the determination is made based on a polarity inversion of differences in pixel luminance of each pixel between focal positions, a maximum of absolute values of differences in pixel luminance of each pixel between focal positions as a criterion, a minimum of entropy values of image segments of the images at the focal positions, or the like.

In the case of determining the stereo numerical model, a noise elimination filter is used for eliminating high space frequency noise. The filter may be a digital filter for carrying out normal transformation for once transforming the stereo numerical model into space frequency components, for filtering for eliminating high frequency components from the space frequency components, and for executing an inverse transformation for restoring the space frequency components with the high frequency components removed back to the stereo numerical model. Alternatively, the filter may be a digital filter for handling the image signals for each image segment comprising a plurality of pixels, and taking either a luminance value observed most frequently in an image segment or an average of luminance values in an image segment as a uniform value of the image signals of pixels in the image segment.

BRIEF DESCRIPTION OF THE DRAWINGS

Other objects, features and advantages of the present invention will become more apparent from the following detailed description made with reference to the accompanying drawings. In the drawings:

FIG. 17 is a model diagram showing a first stage of an in-focus transformation process carried out in an eighth modified version of the first embodiment;

FIG. 18 is a model diagram showing a second stage of the in-focus transformation process carried out in the eighth modified version of the first embodiment;

FIG. 30 is a summary of results produced by the in-focus determination logic embraced in the fourth embodiment;

DETAILED DESCRIPTION OF THE PREFERRED EMBODIMENTS

First Embodiment

Figure 1:
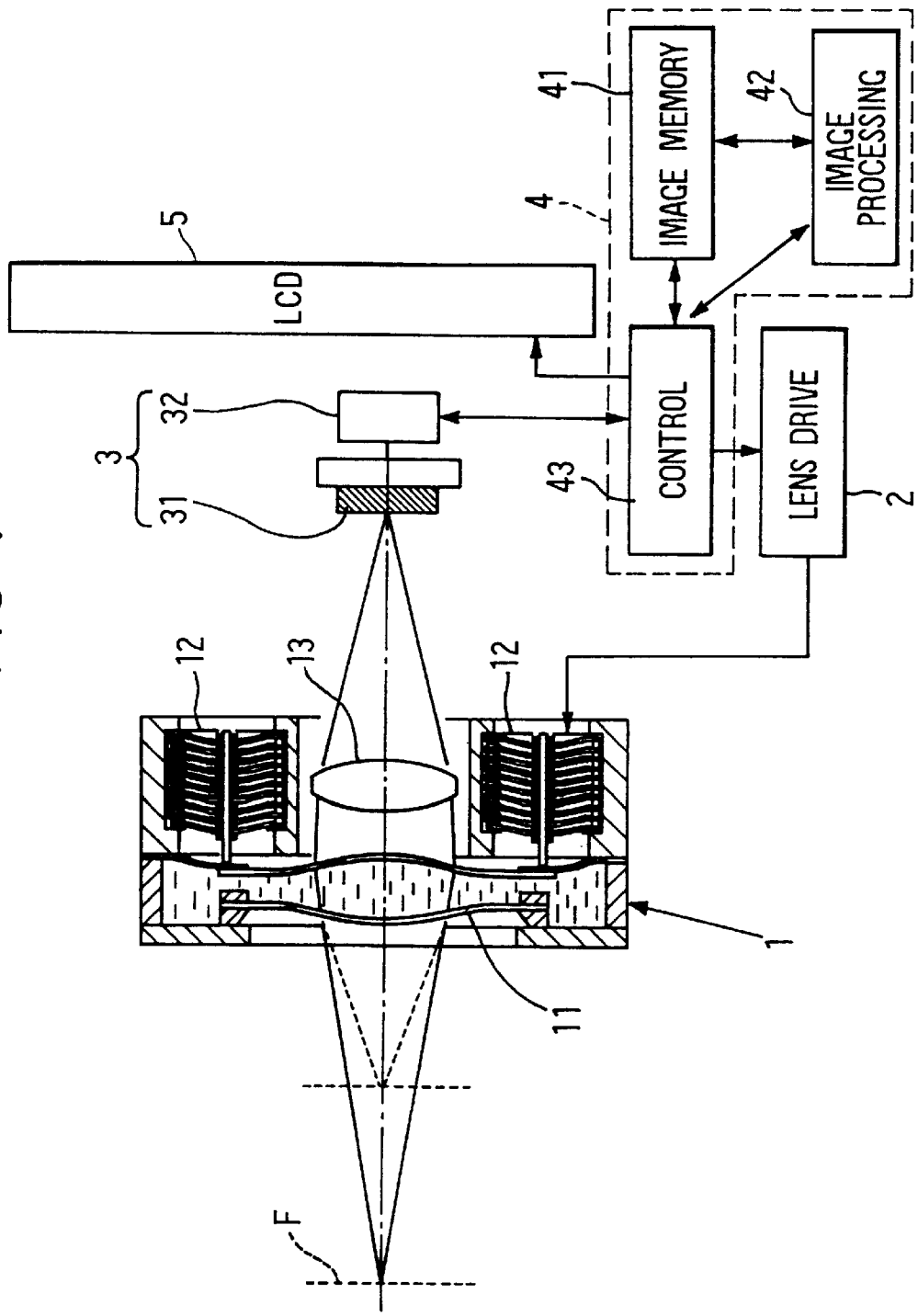
FIG. 1 is a block diagram showing a total-focus imaging apparatus implemented by a first embodiment of the present invention.

As shown in FIG. 1, a total-focus imaging apparatus implemented by a first embodiment comprises a variable-focus lens unit 1, a variable-focus lens driving circuit 2 for changing a focal position of the variable-focus lens unit 1, an image-pickup device 3, a microcomputer 4 and a liquid-crystal display unit 5.

The variable-focus lens unit 1 comprises main components including a variable-focus lens 1 with a variable focal position with respect to an object of observation, a plurality of actuators 12 for changing the focal position (that is, the position of a focus plane F) of the variable-focus lens 1 and a fixed lens unit 13. The variable-focus lens 1 is a sealed liquid type having a pair of transparent elastic films and transparent liquid sealed in an internal space enclosed by the films. The transparent elastic films each have a curvature that can be changed by a difference between pressures applied to the front and back surfaces of the film.

The actuators 12 are each a piezoelectric actuator 12 comprising a plurality of piezoelectric devices (or piezoelectric bimorph elements) stacked on each other. The sealed liquid lens 1, the actuators 12 and a fixed lens unit 13 are assembled with each other to form a single assembly of the variable-focus lens unit 1. The variable-focus lens unit 1 is a microscope having a function to enlarge an object of observation and to form an image of the enlarged observation object on the image-pickup device 3. It should be noted that the configuration of the variable-focus lens unit 1 is similar to a variable-focus lens unit disclosed in U.S. Pat. No. 5,917,657.

The variable-focus lens driving circuit 2 is for driving all the piezoelectric actuators 12 synchronously by applying a proper voltage to each of the actuators 12. Provided with a function to convert an image formed thereon by the variable-focus lens 1 into an output image signal of each pixel, the image-pickup device 3 comprises a CCD element 31 and a CCD driving circuit 32. The photographic surface of the CCD element 31 is placed at a fixed position relative to the variable-focus lens unit 1. At this position, an image of an observation object is formed by the sealed liquid lens 1 and the fixed lens unit 13.

The microcomputer 4 comprises the image memory, 41 for storing image signals of a plurality of images received from the image-pickup device 3, an image processing circuit 42 for selecting an image signal best brought to a focus among the signals of the images by evaluation for each pixel and extracting the selected image signal to generate an image brought to a focus and a control circuit 43 for controlling the whole total-focus imaging apparatus. The evaluation by the image processing circuit 42 for each pixel brought to a focus is determination of a focal position of a peak space frequency owned by the pixels and surrounding pixels. The image memory, 41 is a frame memory capable of inputting and outputting image signals in image units at high speeds.

The liquid-crystal display unit 5 is a display unit for displaying an image brought to a focus. The liquid-crystal display unit 5 displays an image in accordance with control executed by the control circuit 43 employed in the microcomputer 4. That is, the control circuit 43 employed in the microcomputer 4 has a function to synchronously and properly control the variable-focus lens driving circuit 2, the solid-state image-pickup device 3, the image memory, 41, the image processing circuit 42 and the liquid-crystal display unit 5.

Figure 2:
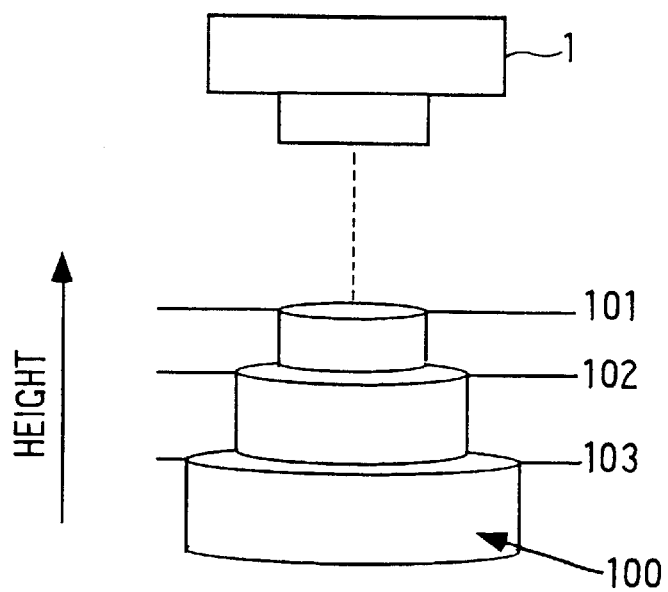
FIG. 2 is a diagram showing a squint view of the shape of a typical observation object photographed in the first embodiment.

Here, it is assumed that the variable-focus lens unit 1 be used to observe large, medium and small cylinders as a typical object 100 of observation from a position right above the object as shown in FIG. 2. The small, medium and large cylinders having top, middle and bottom surfaces 101, 102 and 103, respectively, and heights different from each other are stacked one on another.

Figure 3:
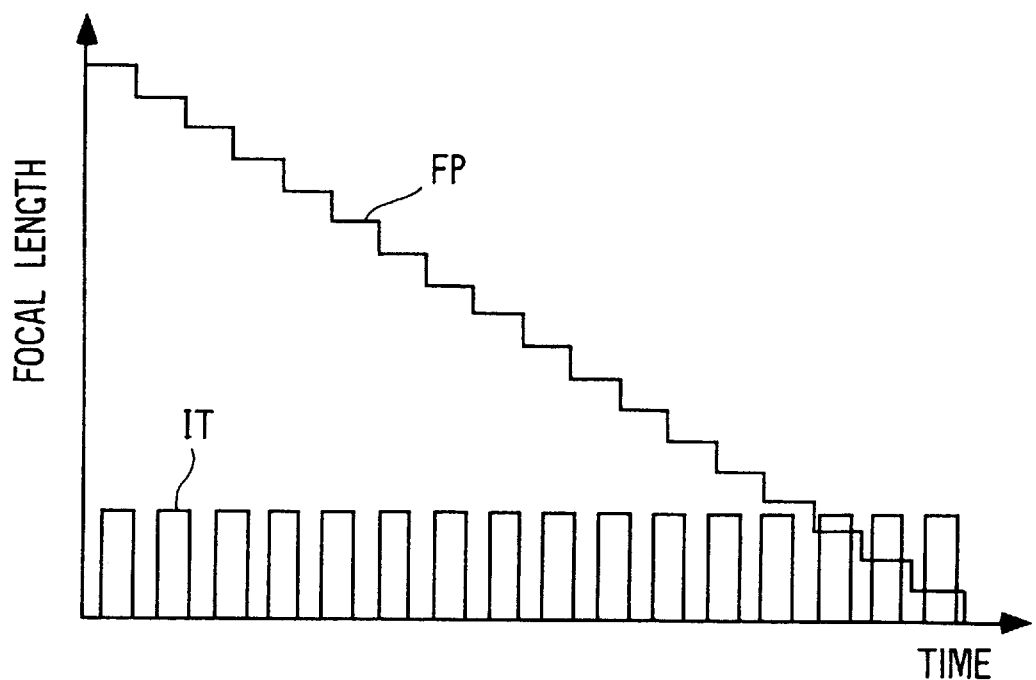
FIG. 3 is a graph representing a relation between the position of the focus and the imaging timing in the first embodiment.

The focal position FP of the variable-focus lens unit 1 is changed in accordance with a stepwise movement pattern by a predetermined pitch at predetermined intervals (imaging timing IT) as shown in FIG. 3. The focal position is varied by changing the frequency of the sealed liquid lens 1. The frequency of the sealed liquid lens 1 is changed by the piezoelectric actuators 12 of the variable-focus lens unit 1 which are driven by the variable-focus lens driving circuit 2 under control executed by the control circuit 43 employed in the microcomputer 4 shown in FIG. 1. The response speed of the very small piezoelectric actuators 12 to change the frequency of the sealed liquid lens 1 is extremely high. Since back-and-forth movements along the entire stroke can take place as a vibration with a frequency of several hundreds of Hz, a slight change in focal position can be made within a period of the order of several tens of microseconds.

In this instance, the imaging rate of the CCD element 31 can be raised to a value of the order of several hundreds of Hz. In addition, the control circuit 43 controls the image-pickup operation of the CCD element 31 synchronously with variations in focal position of the variable-focus lens unit 1. More specifically, while the focus of the variable-focus lens unit 1 is being sustained at a fixed position, the image-pickup process by the CCD element 31 is carried out as shown in FIG. 3.

Figure 4:
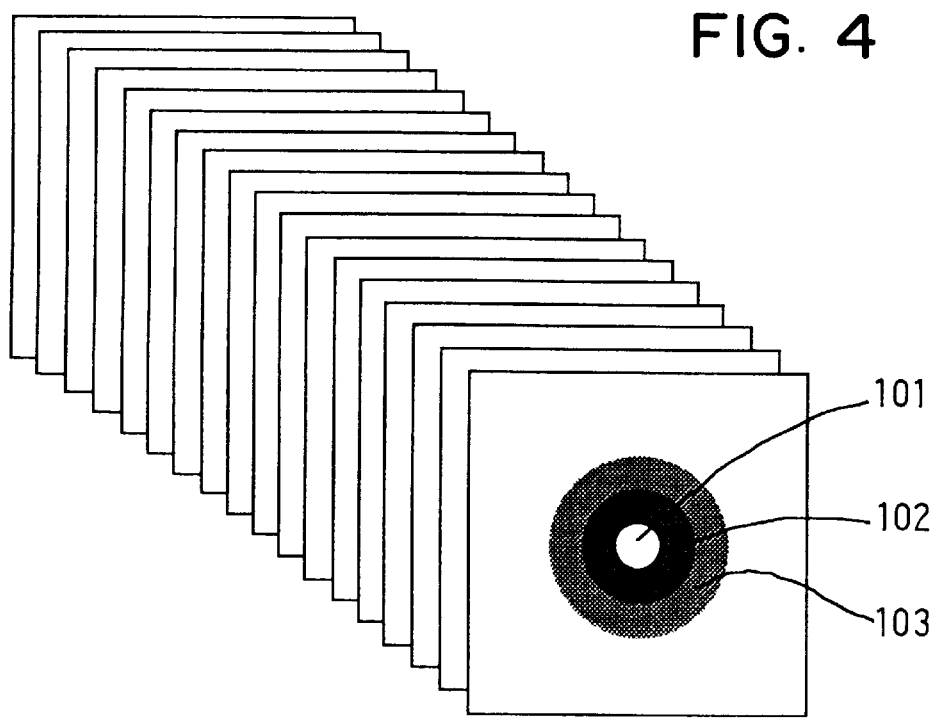
FIG. 4 is a diagram showing a model of a number of image signals obtained as a result of imaging in the first embodiment.

As a result, a number of images with focal positions slightly different from each other are taken as shown in FIG. 4. The images are then sequentially stored in the image memory, 41 by way of the control circuit 43 employed in the microcomputer 4 shown in FIG. 1. The variable-focus lens unit 1 is controlled so that the whole object 100 of observation is included in the stroke range of the focal position which is changed by the variable-focus lens unit 1. Thus, the number of images should include an image with the top surface 101 of the observation object 100 brought to a focus, an image with the middle surface 102 of the observation object 100 brought to a focus and an image with the bottom surface 103 of the observation object 100 brought to a focus. It should be noted that a surface brought to a focus is also referred to as an in-focus surface.

In order to obtain an image with all portions of the observation object 100 brought to a focus, that is, a completely in-focus image, from a number of images taken within the predetermined stroke range of the focal position as described above, it is necessary to determine which pixels of which images are pixels brought to a focus. The determination is a function of the image processing circuit 42 employed in the microcomputer 4.

That is, the determination of an in-focus state of a specific pixel by the image processing circuit 42 is based on detection of a peak value of space frequencies of the specific pixel and pixels surrounding the specific pixel with respect to the focal position among a number of images having focal positions slightly different from each other.

Figure 5:
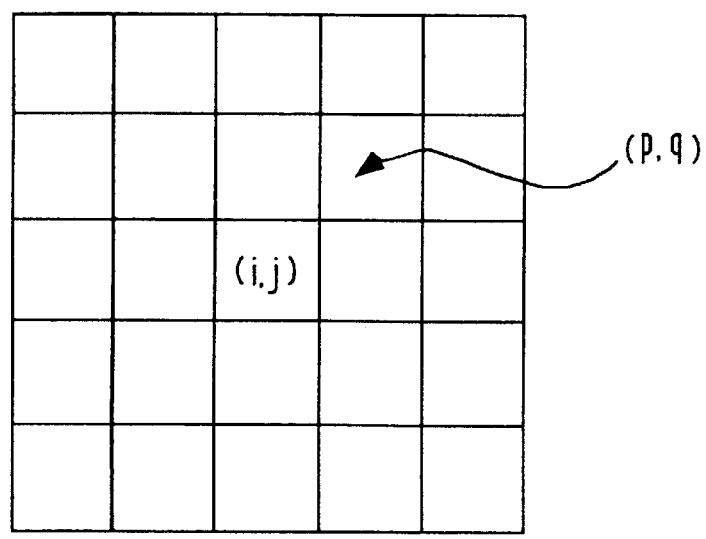
FIG. 5 is a diagram showing a top view of a typical range for computing a space frequency in the first embodiment.

It is assumed that coordinates of a pixel subjected to an in-focus determination process is (i, j) at the center of an image segment comprising 5 pixels×5 pixels as shown in FIG. 5. It is also assumed that each of the pixels in the image segment is identified by coordinates (p, q). In this case, a pseudo space frequency V (i, j) of luminance in the image segment can be expressed by Eq. (1) as follows:

$$V(i, j) = \sum_{a=j-k}^{j+k} \sum_{p=i-k}^{i+k} |Y(i, j) - Y(p, q)|$$

where k=2 and notation Y (p, q) denotes the luminance of a pixel at coordinates (p, q).

When a segment of a certain image centered at the coordinates (i, j) is brought to a focus, the space frequency V (i, j) in the distribution of the luminance Y (p, q) also has a maximum value. As indicated by Eq. (1), the space frequency y (i, j) of a specific pixel subjected to the in-focus determination process includes information on luminance of the pixels surrounding the specific pixel. Involving the surrounding pixels in this way, the in-focus determination is thus a process carried out with a high degree of precision. It should be noted that, in the in-focus determination process, it is not necessary to compute the space frequency V (i, j) for all images. The computation load can be reduced by adopting an algorithm for finding a maximum value as a conventional method of the numerical computation.

In this example, the image segment involved in the computation of the space frequency V (i, j) comprises 5 pixels×5 pixels. However, it is found that, for a very fine image of the same degree as the resolution of the CCD element 31, an image segment of 3 pixels×3 pixels can be used instead. In this case, the space frequency V (i, j) is computed in accordance with Eq. (1) by setting k at 1. In the case of an image with a concentration much coarser than the resolution of the CCD element 31, on the other hand, wider image segments of 7 pixels×7 pixels, 9 pixels×9 pixels and so on can be involved in the computation of the space frequency V (i, j) to determine an in-focus condition properly. It should be noted that the image segment does not have to be rectangular.

Figure 6:
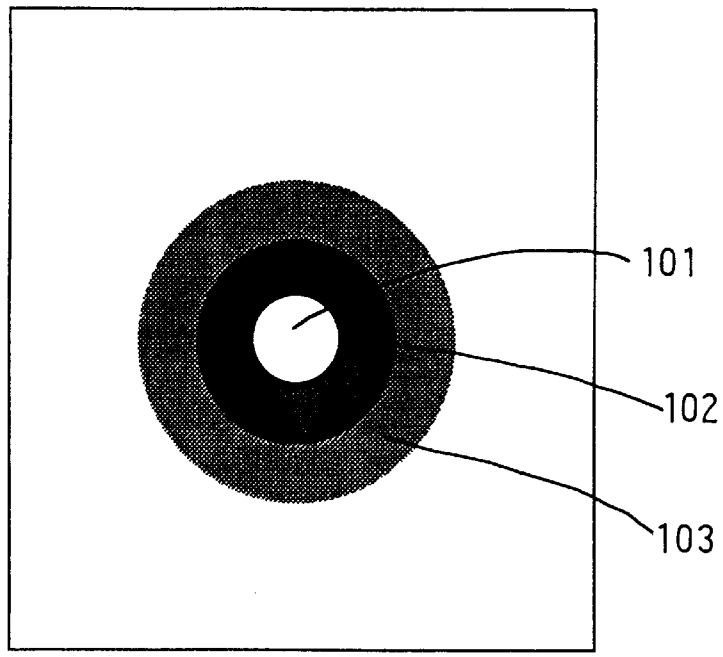
FIG. 6 is a diagram showing an image with the top thereof brought to a focus in imaging in the first embodiment.
Figure 7:
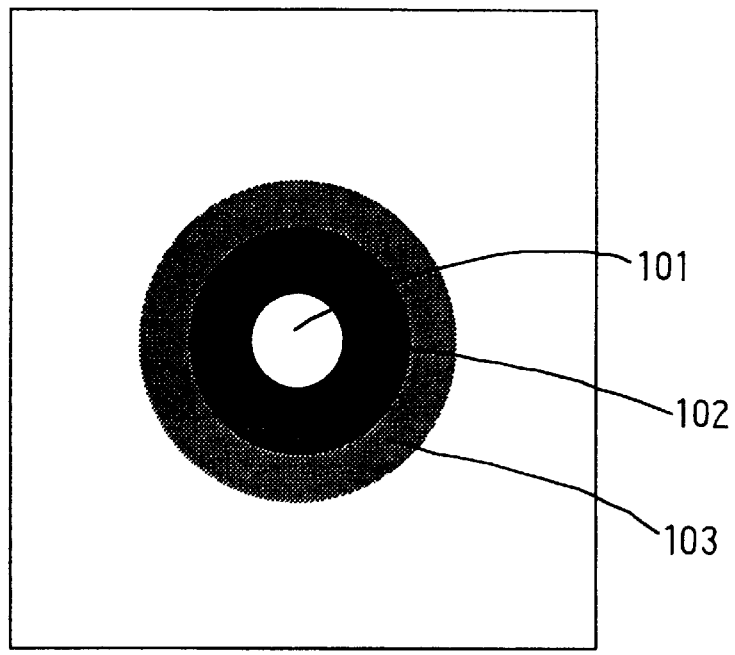
FIG. 7 is a diagram showing an image with a middle portion thereof brought to a focus in imaging in the first embodiment.
Figure 8:
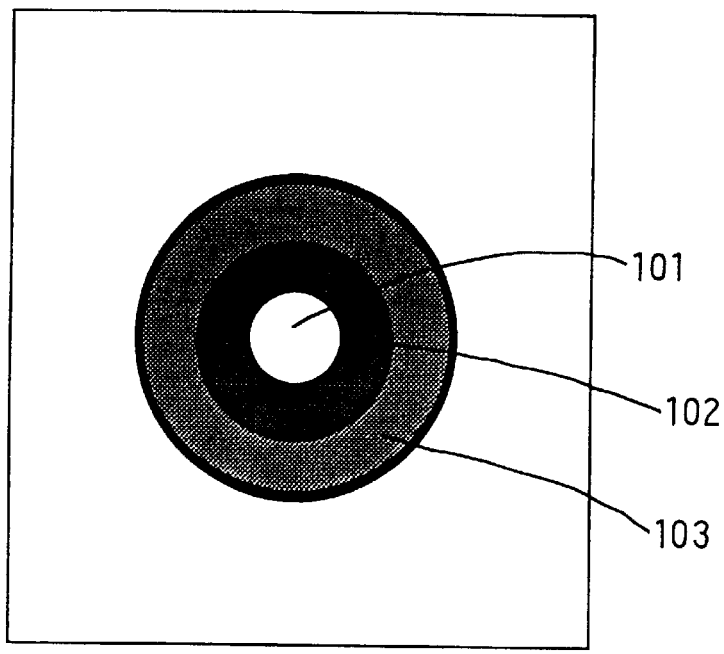
FIG. 8 is a diagram showing an image with the bottom thereof brought to a focus in imaging in the first embodiment.
Figure 9:
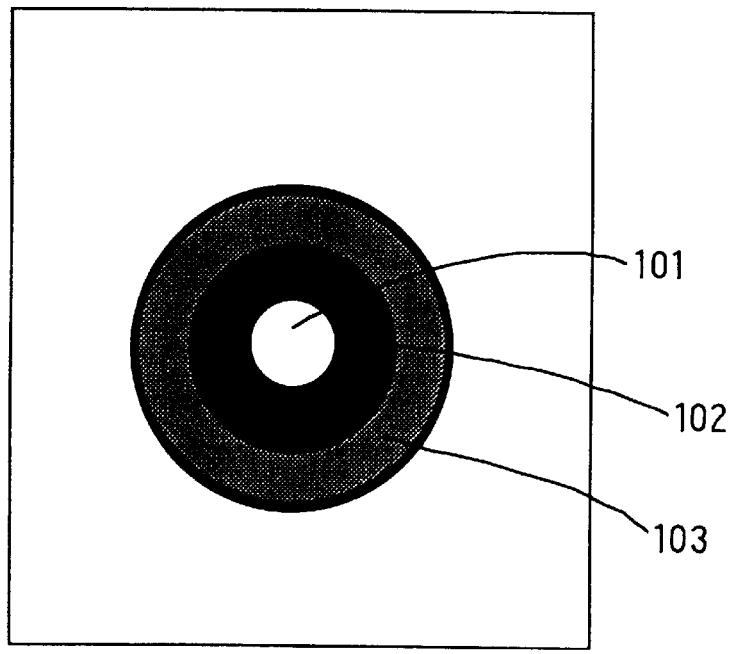
FIG. 9 is a diagram showing an in-focus image produced in the first embodiment.

Pixels selected by the in-focus determination process as described above are stored by the control circuit 43 into the image memory, 41 at other addresses according to apixel layout. Specifically, only pixels of portions brought to a focus are selectively extracted from an image shown in FIG. 6 with the top surface 101 brought to a focus, an image shown in FIG. 7 with the middle surface 102 brought to a focus and an image shown in FIG. 8 with the bottom surface 103 brought to a focus. Since the selected pixels are stored in the image memory, 41 at addresses according to a pixel layout, a completely in-focus image with all portions of the observation object 100 brought to a focus as shown in FIG. 9 is generated in the image memory, 41.

That is, when the in-focus determination process of all pixels is completed, a new completely in-focus image, that is, an image with all portions of the observation object 100 brought to a focus, is generated in the image memory, 41. As soon as the image completely brought to a focus is generated, the control circuit 43 displays the image on the liquid-crystal display unit 5. As a result, the object 100 of observation can be observed by watching an image completely brought to a focus with almost no time delay. It should be noted that, by implementing the image processing circuit 42 as a plurality of concurrent processors, the time delay can be made even shorter.

In addition, the multi-image imaging sequence explained with reference to FIG. 3 can be executed repeatedly by moving the position of the focus back and forth. In each repetition, a new image completely brought to a focus can be displayed on the liquid-crystal display unit 5. In this way, since an image completely brought to a focus can be displayed on the liquid-crystal display unit 5 in a semi-real-time manner, it is possible to observe the motions and the shapes of an observation object in a semi-real-time manner by watching a new image completely brought to a focus even if the object of observation is moving.

Furthermore, the image processing circuit 42 is also provided with a function to determine which image a pixel is extracted from, to provide gradations like a contour map, to give a color to a pixel and to store the contour map with different colors in the image memory, 41. As a result, the total-focus imaging apparatus is capable of not only allowing the observer to observe an image of an observation object brought to a focus in a semi-real-time manner, but also displaying a contour map with different colors to indicate information on different positions in the height direction of the observation object on the liquid-crystal display unit 5 in a semi-real-time manner. Therefore, the observer is capable of recognizing motions and shapes of an observation object presented in a stereo format by obtaining information on the motions and the shapes in the height direction of the observation object in a semi-real-time manner.

Thus, the total-focus imaging apparatus implemented by this embodiment is capable of displaying an image of an observation object completely brought to a focus as a moving image in a semi-real-time manner and, hence, exhibiting an effect of an ability to make the observation of an observation object in a semi-real-time manner possible.

In addition, the total-focus imaging apparatus is also capable of displaying a contour map with different colors to indicate information on different positions in the height direction of the observation object on the liquid-crystal display unit 5 in a semi-real-time manner. Thus, the total-focus imaging apparatus also exhibits an effect of allowing the observer to recognize motions and shapes of an observation object presented in a stereo format by obtaining information on the motions and the shapes in the height direction of the observation object in a semi-real-time manner.

(First Modification)

Figure 10:
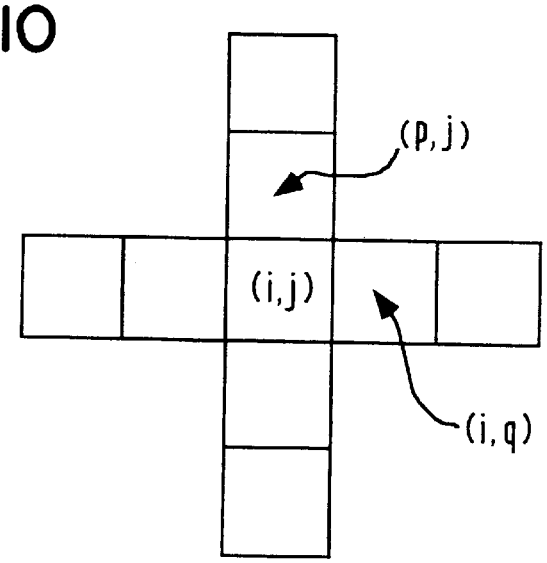
FIG. 10 is a diagram showing a top view of a typical range for computing a space frequency in a first modified version of the first embodiment.

As a first modified version of the first embodiment to implement the total-focus imaging apparatus, an image segment involved in an in-focus determination process can also have a cruciform centered at a pixel subjected to the process as shown in FIG. 10 in place of a rectangular image segment shown in FIG. 5. In this case, the pseudo space frequency V (i, j) is computed in accordance with Eq. (2) given below:

$$V(i, j) = \sum_{p=i-k}^{i+k} |Y(i, j) - Y(p, j)| + \sum_{q=i-k}^{j+k} |Y(i, j) - Y(i, q)|.$$

According to this modified version, the processing load can be decreased. As a result, processing can be carried out at a higher speed to exhibit an effect of an improved real-time performance of the observation.

It should be noted that, in place of a crucial image segment involved in the in-focus determination process to compute the space frequency V (i, j), an image segment with a shape resembling the X character can also be used to provide the same effects as the first embodiment.

(Second Modification)

A second modified version of the first embodiment implements a total-focus imaging apparatus wherein an in-focus determination process of a pixel is carried out in the image processing circuit 42 by detecting polarity inversion of differences in pixel luminance between images at different focal positions.

Figure 11:
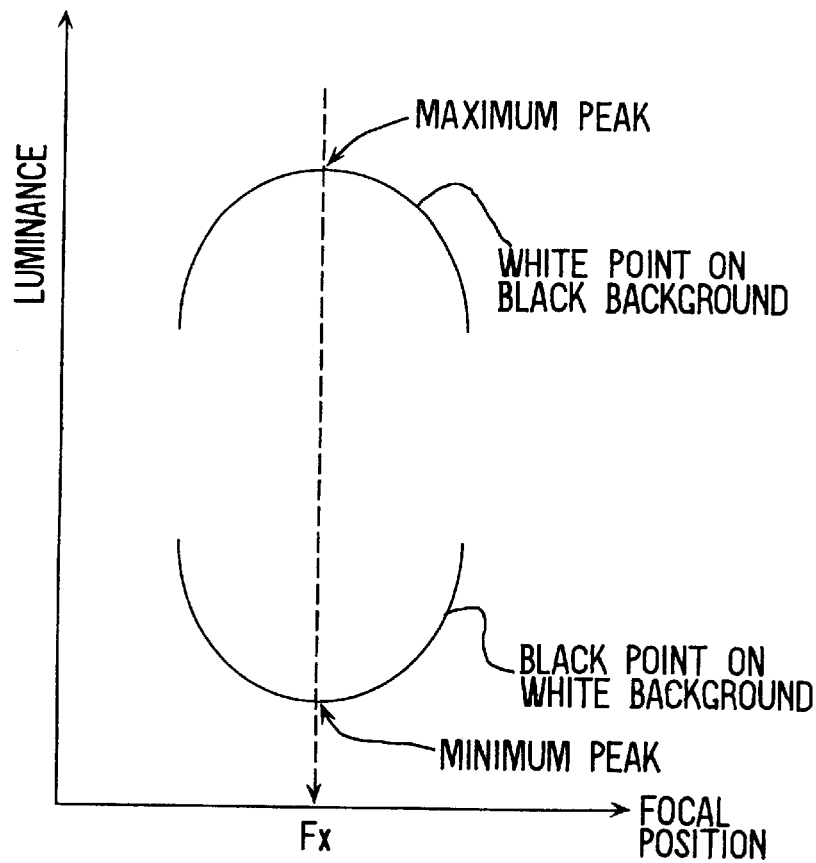
FIG. 11 is a graph representing changes in luminance in a second modified version of the first embodiment.

Specifically, if a pixel in the in-focus determination process has a greater luminance value than the surrounding luminance and pertains to an image brought to a focus, the luminance of the pixel is greater than the luminance values of the same pixel on images at shorter and longer focal distances as shown in the upper part of FIG. 11. Thus, the luminance of the pixel on the image brought to a focus (focal position Fx) can be verified to be a maximum value (peak) by comparison with the luminance values of the same pixel on the images at shorter and longer focal distances. More specifically, the difference in pixel luminance between the image at a shorter focal distance and the image brought to a focus has an inverted polarity of the difference in pixel luminance between the image brought to a focus and the image at a longer focal distance.

If a pixel in the in-focus determination process has a smaller luminance value than the surrounding luminance and pertains to an image brought to a focus, on the other hand, the luminance of the pixel is smaller than the luminance values of the same pixel on images at shorter and longer focal distances as shown in the lower part of FIG. 11. Thus, the luminance of the pixel on the image brought to a focus (focal point Fx) can be verified to be a minimum value (peak) by comparison with the luminance values of the same pixel on the images at shorter and longer focal distances. More specifically, the difference in pixel luminance between the image at a shorter focal distance and the image brought to a focus has an inverted polarity of the difference in pixel luminance between the image brought to a focus and the image at a longer focal distance.

It is of course that in an operation to search luminance values for a maximum and a minimum, a search algorithm used in ordinary numerical computations can be adopted so that it is not necessary to examine the luminance for all pixels. As a result, the processing load can be reduced.

As described above, in the total-focus imaging apparatus implemented by the second modified version, by observing changes in luminance of a pixel alone for each pixel, it is possible to determine whether the pixel is on an image brought to a focus from inversion of the polarity of differences in pixel luminance between images at different focal distances without overlooking a correlation between the pixel and the surrounding pixels. Thus, the amount of processing of the in-focus determination process carried out by the image processing circuit 42 becomes very small, allowing the real-time characteristic of the observation to be improved. As a result, a low-cost image processing circuit 42 can be employed.

Accordingly, the total-focus imaging apparatus implemented by the second modified version exhibits effects of an improved real-time characteristic of the image processing and a reduced cost of the image processing circuit 42 in addition to the effects exhibited by the first embodiment.

If the exposure time of the solid-state image-pickup device 3 and the processing time of the image processing circuit 42 can be further reduced sufficiently, the position of the focus can be changed continuously instead of being changed in accordance with a stepwise movement pattern, making it possible to further improve the real-time characteristic of the observation.

(Third Modification)

A third modified version of the first embodiment implements a total-focus imaging apparatus wherein an in-focus determination process of a specific pixel is carried out in the image processing circuit 42 by verifying a minimum entropy of the specific pixel and pixels surrounding the specific pixel at an in-focal position.

That is, when a specific pixel and pixels surrounding the specific pixel are at an in-focal position, the entropy of a luminance distribution or a color-luminance distribution has a minimum value. Involving information on luminance of pixels surrounding a specific pixel in addition to information of luminance of the specific pixel subjected to an in-focus determination process in this way, the in-focus determination is thus a process carried out with a high degree of precision.

Figure 12:
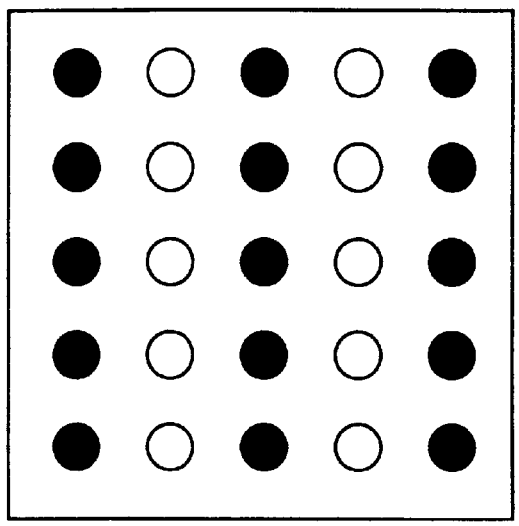
FIG. 12 is a conceptual diagram showing an image segment brought to a focus in a third modified version of the first embodiment.
Figure 13:
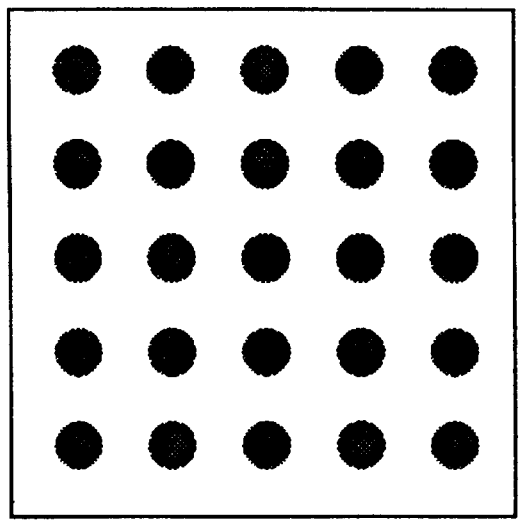
FIG. 13 is a conceptual diagram showing an out-of-focus image segment in the third modified version of the first embodiment.

Specifically, in an in-focus state, a clearly distinct image like one shown in FIG. 12 is obtained. In this image, the probability of the luminance's being uniform for all pixels in the image segment is high, resulting in a minimum entropy. In an out-of-focus state where the focus is positioned at a location far away from the in-focal position, on the other hand, a blurred image with a decreased amount of contrast like one shown in FIG. 13 is obtained. As a result, the probability of the luminance's being uniform for all pixels in the image segment is high, increasing the entropy. That is, the farther the position of the focus is separated away from the in-focal position, the greater the entropy.

In this modified version, the entropy is calculated by using Eq. (3) given as follows:

$$H = -\sum_{i=0}^{255} \{Pi \cdot \log_2(Pi)\}$$

where the symbol Pi is a probability of generation of data i. It is assumed that there are 256 luminance gradations, namely, gradations 0 to 255, and there are n pixels with luminance i. In this case, Pi=n/256.

In addition, an entropy can also be calculated for each small image segment of, that is, 2 pixels×2 pixels or 3 pixels×3 pixels, allowing an in-focus determination process to be carried out for each image segment instead of each pixel. Thus, the processing load of the image processing circuit 42 can be decreased since the in-focus determination process is carried out for each image segment, making it unnecessary to perform an in-focus determination process for each pixel. As a result, there are exhibited effects of an improved real-time characteristic of the image processing and a decreased cost of the image processing circuit 42.

It should be noted that, while there are several methods of computing an entropy, it is not always necessary to calculate an entropy in a strict manner. That is, an entropy may be calculated by approximation by adoption of a simplified processing algorithm.

(Fourth Modification)

A fourth modified version of the first embodiment implements a total-focus imaging apparatus wherein the in-focus determination process is carried out for a specific pixel in the image processing circuit 42 by detecting a maximum of a luminance amplitude representing a difference between maximum and minimum values of luminance among pixels in an image segment including the specific pixel and pixels surrounding the specific pixel. This fourth modified version detects a maximum amount of contrast between a brightest pixel and a darkest pixel in a small image segment including a pixel subjected to the in-focus determination process as a value indicating an in-focus condition.

Figure 14:
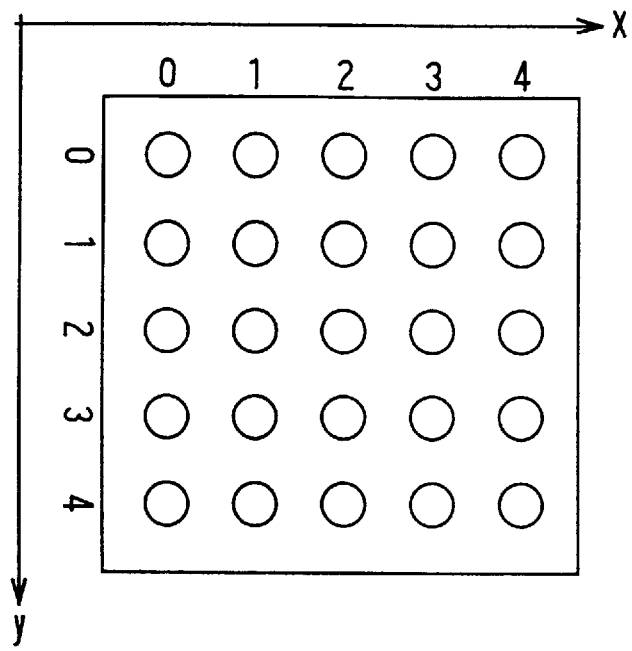
FIG. 14 is a diagram showing a top view of a matrix of pixels in an image segment in a fourth modified version of the first embodiment.
Figure 15:
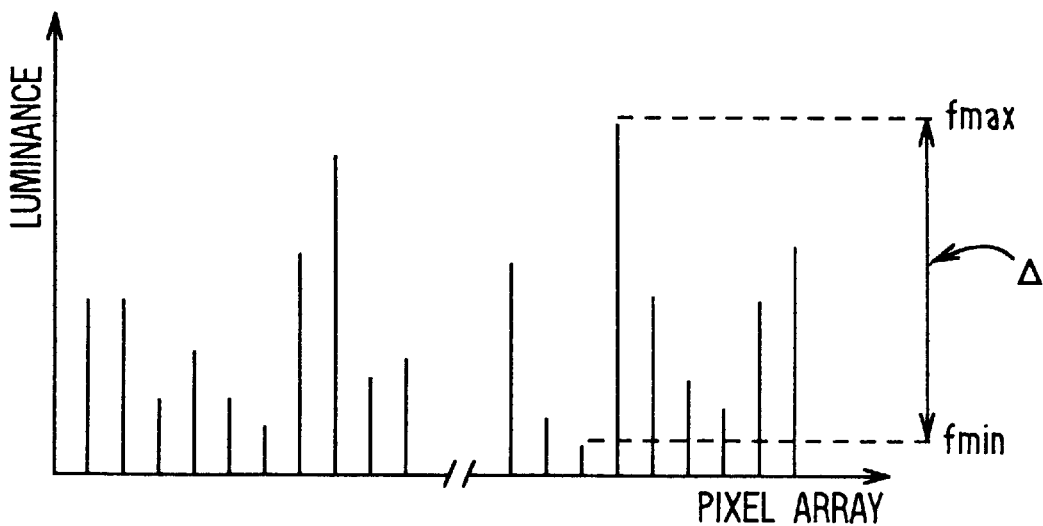
FIG. 15 is a graph showing luminance amplitudes in the fourth modified version of the first embodiment.

The luminance amplitude in a rectangular image segment comprising typically 5 pixels×5 pixels as shown in FIG. 14. As shown in FIG. 15, the luminance amplitude Δ is a difference between a maximum luminance, that is, the luminance of a brightest pixel, and a minimum luminance, that is, the luminance of a darkest pixel, or Δ=fmax−fmin, where notations fmax and fmin denote the maximum luminance and the minimum luminance respectively. A focal position with a maximum luminance difference Δ is detected as the in-focal position of an image segment and a pixel at the center of the image segment is regarded as a pixel at an in-focal position.

The algorithm adopted by this fourth modified version to determine an in-focal position is characterized in that it is not necessary at all to carry out a complex calculation involving luminance values of pixels in an image segment. Instead, it is necessary to merely find out a maximum value fmax and a minimum value fmin and than compute a luminance difference as Δ=fmax−fmin. Thus, the in-focus determination process entails very simple processing. Therefore, not only is the development of the algorithm simple, but the processing load of a digital processing circuit for implementing the algorithm is also very small. As a result, the processing can be carried out at high speeds even if a low-cost processing circuit is used. In spite of these merits, the in-focus determination process can yet be carried out with a very high degree of reliability.

Accordingly, the fourth modified version exhibits an effect of an ability to carry out the in-focus determination process with a very high degree of reliability in spite of the fact that the processing can be carried out at high speeds even by using a low-cost processing circuit in addition to the effects provided by the first embodiment.

(Fifth Modification)

A fifth modified version of the first embodiment implements a total-focus imaging apparatus wherein the in-focus determination process is carried out for a specific pixel in the image processing circuit 42 by detecting a maximum discrete-cosine-transformation (DCT) coefficient in an image segment including the specific pixel and pixels surrounding the specific pixel. The fifth modified version determines that a specific pixel and pixels surrounding the specific pixel are in an in-focus state when a maximum discrete-cosine-transformation coefficient in an image segment including the specific pixel and pixels surrounding the specific pixel is detected. This is because, in an in-focus state, a sharp image is obtained.

Figure 16:
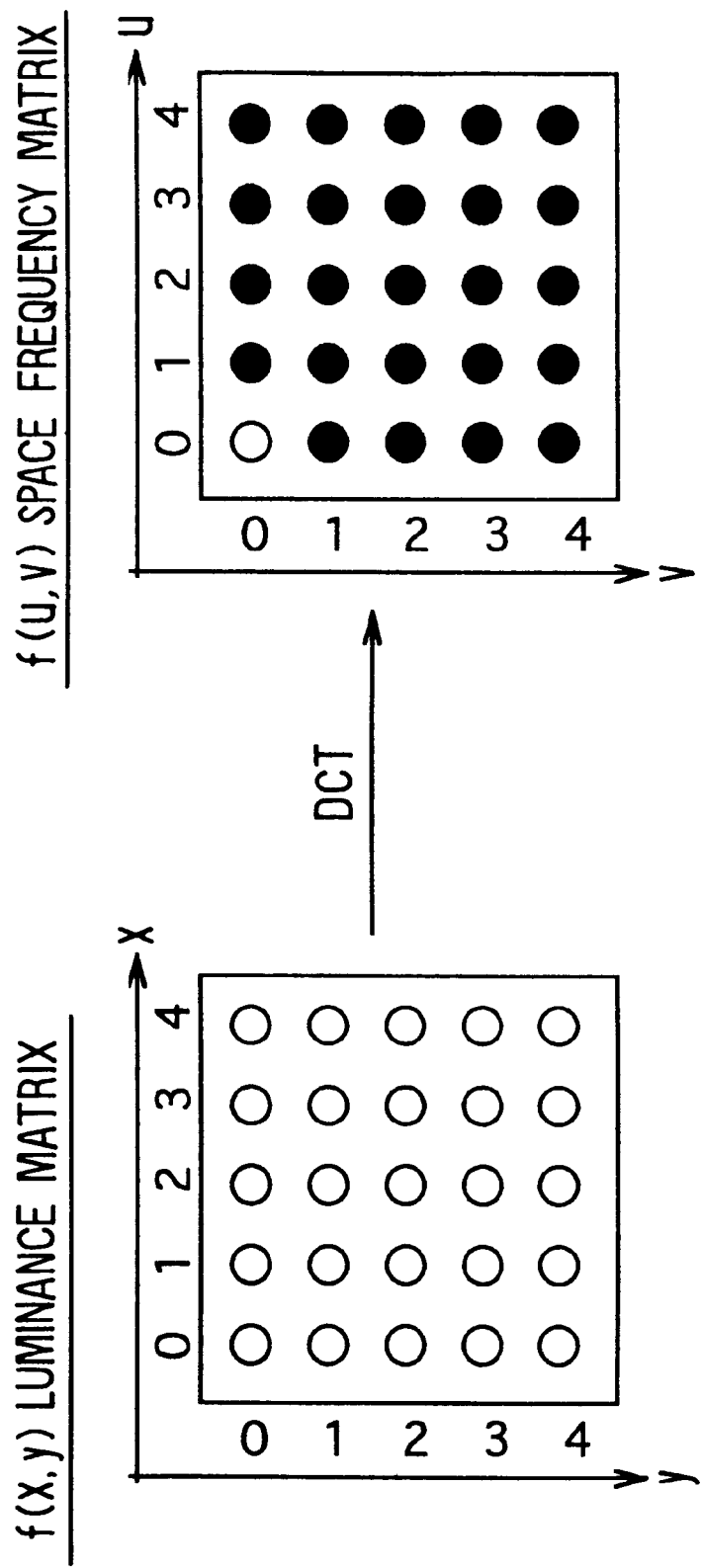
FIG. 16 is a diagram showing the concept of discrete cosine transformation carried out in a fifth modified version of the first embodiment.

In this fifth modified version, a luminance matrix of an image segment subjected to an in-focus determination process is transformed into a space frequency matrix by discrete cosine transformation as shown in FIG. 16, and a discrete-cosine-transformation coefficient D is then calculated in accordance with Eq. (4) given as follows:

$$D = \left(\sum_{v=0}^{N-1}\sum_{u=0}^{N-1} |F(u, v)|\right) - |F(0, 0)|$$

where $$F(u, v) = F(u, v)$$
$$= C(u)C(v)\sum_{y=0}^{N-1}\sum_{x=0}^{N-1} f(x, y)\cos\frac{(2x+1)u\pi}{2x(N-1)}\cos\frac{(2y+1)v\pi}{2x(N-1)}$$

In an in-focus state, a clearly distinct image is obtained and the amount of contrast in an image segment subjected to the in-focus determination process is maximized. In this case, a maximum discrete-cosine-transformation coefficient D is resulted in as is generally known. In an out-of-focus state, on the other hand, a blurred image is obtained and the amount of contrast in an image segment subjected to the in-focus determination process decreases. In this case, a reduced discrete-cosine-transformation coefficient D is obtained as is also generally known. For this reason, the fifth modified version determines that a specific pixel and pixels surrounding the specific pixel are in an in-focus state when a maximum discrete-cosine-transformation coefficient in an image segment including the specific pixel and pixels surrounding the specific pixel is detected.

An LSI for carrying out the discrete cosine transformation processing has been developed for image processing in an MPEG system and is already available in the market. Thus, the already developed product of the MPEG processing LSI can be purchased at a low price, making it unnecessary to newly develop a new LSI dedicated to the discrete cosine transformation processing. In addition, since there realso a number of already developed products for television images, processing with a high video rate such as 30 times per second can also be carried out by using a low-cost already developed product. As a result, the total-focus imaging apparatus implemented by this modified version to include such an image processing circuit is capable of carrying out processing at high speeds and can be manufactured at a relatively low cost.

Thus, the total-focus imaging apparatus implemented by this modified version exhibits an effect that it is possible to present a product which is manufactured at a low cost but capable of carrying out the in-focus determination process at high speeds and with a high degree of accuracy.

It should be noted that, in order to find the maximum value of the discrete cosine transformation coefficient D, the calculation of the coefficient D does not have to involve all pixels in the image segment subjected to the in-focus determination process. Instead, a commonly known numerical-computation method to find a maximum value can be applied to pixels selected at random from points in the image segment subjected to the in-focus determination process to compute the discrete cosine transformation coefficient D. Accordingly, the processing load can be reduced. Thus, this modified version offers another merit of a shorter time it takes to complete the in-focus determination process.

(Sixth Modification)

A sixth modified version of the first embodiment implements a total-focus imaging apparatus wherein the in-focus determination process is carried out for each image segment comprising a plurality of pixels in the image processing circuit 42. Thus, in this modified version, the space frequency, the entropy, the luminance amplitude or the discrete-cosine-transformation coefficient of an image segment is used as a criterion for in-focus determination. That is, in the case of the first embodiment as well as the first, third, fourth and fifth modified versions of the first embodiment, pixels surrounding a specific pixel are also used as an object of examination in the in-focus determination process for each specific pixel. In the case of this sixth modified version, on the other hand, the in-focus determination process is carried out for each image segment comprising a plurality of pixels.

In consequence, it is impossible to obtain a fine image brought to a focus as a result of an in-focus determination process carried out for each pixel. However, it is possible to produce a comparatively distinct image with each small segment thereof brought to a focus. In addition, the larger the number of pixels included in an image segment much smaller the magnitude of the processing load borne to carry out the in-focus determination process. For example, in the case of an image segment comprising 2 pixels×2 pixels, the processing load is reduced to ¼ and, in the case of an image segment comprising 3 pixels×3 pixels, the processing load is reduced to ⅑. As result, the in-focus determination process can be carried out at high speeds.

Thus, the total-focus imaging apparatus implemented by the sixth modified version exhibits an effect of a very small processing load borne in the in-focus determination process and a high-speed processing in comparison with the third and fifth modified versions.

It should be noted that the exhibited characteristic varies in dependence on which of the space frequency, the entropy, the luminance amplitude and the discrete-cosine-transformation coefficient of an image segment is used as an indicator in the in-focus determination process.

(Seventh Modification)

A seventh modified version of the first embodiment implements a total-focus imaging apparatus wherein the in-focus determination process is carried out for either each pixel or each image segment comprising a plurality of pixels in the image processing circuit 42 by adopting a plurality of in-focus determination methods different from each other. The variety of in-focus determination methods adopted in the in-focus determination process carried out for each pixel have been explained earlier in the description of the first embodiment and the first to fifth modified versions of the first embodiment. On the other hand, the in-focus determination method adopted in the in-focus determination process carried out for each image segment has been explained earlier in the description of the first embodiment and the sixth modified version.

In this modified version, the in-focus determination process is carried out by combining a plurality of in-focus determination methods instead of adopting only a particular in-focus determination method. As a result, since a plurality of in-focus determination methods are adopted as a combination, a more reliable in-focus determination process can be carried out. Techniques of adopting a plurality of in-focus determination methods as a combination include a technique based on a computed average, a technique based on determination by a majority and a technique based on an average of values which are left after the standard deviation has been decreased by discarding values deviating from a group. By adopting a plurality of in-focus determination methods as a combination, an in-focus determination bias inherent in each of the methods can be corrected to improve the accuracy of the in-focus determination process.

Thus, by virtue of the total-focus imaging apparatus implemented by the seventh modified version, the reliability of the in-focus determination process can be improved over the first embodiment and the first to sixth modified versions of the first embodiment and, hence, the number of erroneous results produced by the process can be reduced. As a result, there is exhibited an effect of generating a more clearly distinct image brought to a focus and creating a more accurate stereo numerical model.

(Eighth Modification)

An eighth modified version of the first embodiment implements a total-focus imaging apparatus wherein the in-focus determination process is carried in the image processing circuit 42 at 2 stages in order to improve the precision of the in-focus determination for each pixel or each image segment. At the first stage, an in-focus determination process is carried out for a specific image segment comprising a single pixel or a plurality of pixels and for a plurality of image segments surrounding the specific image segment. At the second stage, an in-focus determination process is carried out for a large image segment comprising the specific image segment and the image segments surrounding the specific segment the second stage is thus a stage for repeating an in-focus determination process for the image segments. In this modified version, the same in-focus determination method is adopted for both the stages. As an alternative, an in-focus determination method adopted at the first stage can also be different from a method adopted for the second stage.

At the first stage, an in-focus determination process is once carried out for a specific image segment (Z1) subjected to such determination and for a plurality of image segments (Z2 to Z9) surrounding the specific image segment as shown in FIG. 17. The in-focus determination process is carried out uniformly for each of the image segments of an image. Accordingly, an almost correct in-focus determination process is carried out not only the specific image segment (21), but also for the image segments (Z2 to Z9) surrounding the specific image segment.

At the second stage, an in-focus determination process is carried out for a large image segment (or Z1 to Z9) comprising the specific image segment and the image segments surrounding the specific image segment as shown in FIG. 18 after calculation results (CAL) of the in-focus determination processes carried out at the first stage have been obtained in order to again determine the in-focus state of the specific image segment (Z1). Thus, the in-focal position of image segment Z1 is updated also on the basis of the in-focal positions of image segments Z2 to Z9. Specifically, the in-focus determination process of the specific image segment (or image segment Z1) is started from a corner and carried out sequentially one image segment after another.

In an image segment completing the in-focus determination process of the second stage, the in-focal position is updated from a value of the first stage to a value of the second stage. As a result, the in-focus determination for the specific image segment (Z1) can be carried out with a higher degree of precision to produce a more accurate in-focal position since all but accurate in-focal positions of the image segments (Z2 to Z9) surrounding the specific image segment have been obtained.

In this way, the total-focus imaging apparatus implemented by this modified version is capable of further improving the precision of an in-focal position of a pixel or an image segment and exhibits an effect of generating a very clearly distinct image brought to a focus and creating an extremely accurate stereo numerical model.

(Ninth Modification)

A ninth modified version of the first embodiment implements a total-focus imaging apparatus wherein the control circuit 43 shown in FIG. 3 controls the variable-focus lens driving circuit 2 in order to continuously change the position of the focus, and controls the image-pickup device 3 to continuously photograph an object of observation while an in-focus plane F at the position of the focus is being moved. In this modified version, the position of the focus is moved at a constant speed, following a line of a movement pattern having a saw-tooth shape shown in FIG. 19.

The required movement speed of the focal position varies in dependence on, among other factors, the exposure time of the image-pickup device required for imaging an image, the number of required images and the depth of field. Even if a request for a high movement speed of the focal position is made, such a request can be generally met by using the variable-focus lens unit 1 like the one employed in the first embodiment. Thus, a number of images with focal positions different from each other can be taken in a very short period of time. It is also possible to generate an image completely brought to a focus and to create a stereo numerical model even for an object of observation with a brisk movement or an object of observation providing only a very short shutter chance.

In addition, in order to produce a clearly distinct image brought to a focus in this modified version, the control circuit 43 controls the driving means 2 to adjust the movement speed of the focal position in accordance the depth of field of the sealed liquid lens 1 which is used as a variable-focus lens. That is, as is the case with this modified version, if the position of the focus moves only within the range of the depth of field during an operation to take an image, focus blurring hardly occurs in the image.

It is thus possible to take a clearly distinct image as if the image were obtained as a result of imaging a static object of observation since the position of the focus is changed in accordance with a stepwise movement pattern even if the position of the focus is really moved continuously. Therefore, it is possible to take a clearly distinct image as if the image were obtained as a result of imaging a stationary object of observation by changing the position of the focus in accordance with a stepwise movement pattern even over a relatively long period of time and even if the position of the focus is really moved continuously during a short continuous imaging period. As a result, it is possible to generate a clearly distinct image completely brought to a focus and to create a relatively accurate stereo numerical model in a short period of time.

Accordingly, by virtue of this modified version, it is possible to generate a clearly distinct image completely brought to a focus and to create a relatively accurate stereo numerical model in a short period of time in a short period of time even for an object of observation with a brisk movement or an object of observation providing only a very short shutter chance.

(Tenth Modification)

Figure 20:
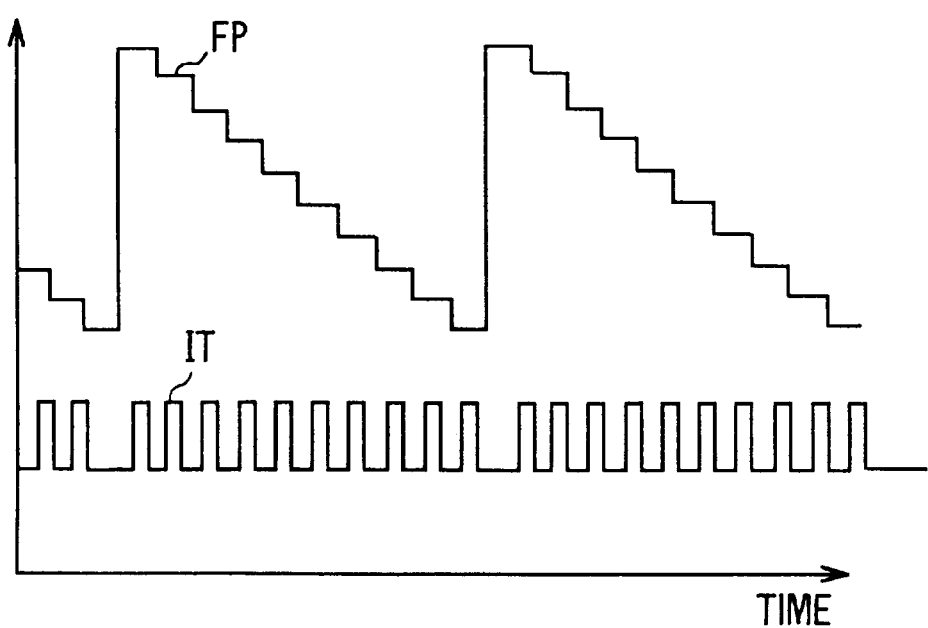
FIG. 20 is a diagram showing a pattern of movement of the focal position in a tenth modified version of the first embodiment.

A tenth modified version of the first embodiment implements a total-focus imaging apparatus wherein the control circuit 43 properly controls the driving means 2 to change the focal position F in accordance with stepwise movement patterns along the time axis shown in FIG. 20 and controls the image-pickup device 3 to take a photograph while the focal position F is in a stationary state.

With such control executed, the position of the focus can be made stationary while an imaging operation is under way. Thus, even though an image completely brought to a focus cannot be taken in as short a period of time as the ninth modified version, the focus blurring is eliminated from each of a number of taken images. As a result, it is possible to generate a more clearly distinct image completely brought to a focus and to create a more accurate stereo numerical model.

By virtue of the total-focus imaging apparatus implemented by this modified version, the focus blurring is eliminated from each of a number of taken images, making it possible to generate a more clearly distinct image completely brought to a focus and to create a more accurate stereo numerical model.

(Eleventh Modification)

The eleventh modified version of the first embodiment combines the merits offered by the ninth and tenth modified versions, implementing a total-focus imaging apparatus capable of generating a more clearly distinct image completely brought to a focus and creating a more accurate stereo numerical model. Specifically, the total-focus imaging apparatus implemented by this modified version is characterized in that the apparatus allows a preview operation, range determination processing and real imaging operation to be carried out.

Figure 19:
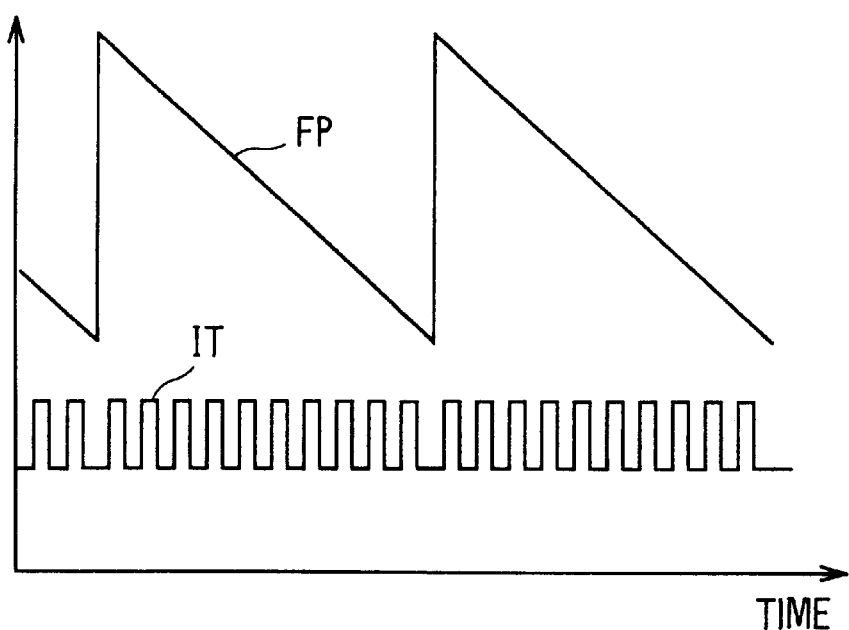
FIG. 19 is a timing diagram showing a pattern of movement of the focal position in a ninth modified version of the first embodiment.

Specifically, the control apparatus 43 executes control to carry out a preview operation to perform continuous imaging while continuously and swiftly moving the focal position F as shown in a process of FIG. 19, range determination processing to determine a range of the focal position F in which an object of observation exists in the course of the preview operation, and an real imaging operation to again change the focal position F in this determined range in accordance with stepwise movement patterns of a process shown in FIG. 20 and to photograph the object of observation while the focal position F is in a stationary state.

First of all, in the preview operation, the focal position F is moved continuously at high speeds in the same way as the ninth modified version and the image-pickup device 3 consecutively takes a plurality of images with focal positions different from each other in a very short period of time. At that time, the movement speed of the focal position F may well exceed the range of the depth of field. This is because the preview operation is carried out in order to examine the range of the focal position in which the object of observation exists.

Then, the range determination processing determines which movement range of the focal position F detected in the preview operation the object of observation exists in. Thus, the range determination processing is normally carried out after the preview operation has been completed. If there is a strong request for reduction of the imaging time, however, it will be desirable to carry out the range determination processing concurrently with the preview operation in real-time or a semi-real-time manner. After the range in which the object of observation has been clarified in the range determination processing, the real imaging operation is then carried out. In the real imaging operation, the position of the focus is moved in accordance with stepwise movement patterns over a range in which the position of the focus can be moved and the object of observation exists, and an image is taken each time the position of the focus is put in a stationary state.

As described above, the imaging process is divided into two stages, namely, a preview operation and real imaging operation. Thus, since the range of the focal position in which the object of observation is to be photographed is determined on the basis of images obtained in the preview operation, the real imaging operation can be carried out in a short period of time. Therefore, since both the preview operation and the real imaging operation can be completed in a short period of time, the total imaging time can be shortened. As a result, since an image with a stationary focal position and, hence, no focus blurring can be photographed in the real imaging operation, it is possible to generate a more clearly distinct image completely brought to a focus and to create a more accurate stereo numerical model.

As an alternative, the step of the stepwise movement pattern to move the position of the focus in the real imaging operation can be made finer to allow a greater number of images to be taken. In this case, even though the imaging time of the real imaging operation becomes longer, it is possible to generate an even more clearly distinct image completely brought to a focus and to create an even more accurate stereo numerical model.

Thus, the total-focus imaging apparatus implemented by this modified version exhibits an effect of an ability to generate a more clearly distinct image completely brought to a focus and to create a more accurate stereo numerical model.

(Twelfth Modification)

The twelfth modified version of the first embodiment implements a total-focus imaging apparatus wherein the CCD element 31 is capable of outputting a color image in place of a monochrome image. In the first embodiment, attention is paid to only the luminance of each pixel, leading to an implicit assumption that the CCD element 31 is a monochrome device. The twelfth modified version is an implementation of the first embodiment wherein the CCD element 31 generates a color image. As a matter of fact, the twelfth modified version can be regarded as an implementation of each modified version of the first embodiment into a color imaging apparatus.

Allowing the user to observe an object of observation on a naturally colored screen in a semi-real-time manner, this modified version exhibits an effect of suitability for observation of a colored object or an object with a changing color. In addition to this effect, in the case of a pixel for which an in-focus determination process is difficult to carry out due to the compound luminance of the three RGB colors, the in-focus determination process can be carried out for the luminance of one of the three RGB colors. In this way, this modified version also exhibits an effect of an ability to carry out an in-focus determination process for portions with colors different from each other even if the portions have equal luminance.

It should be noted that the performance of the twelfth modified embodiment can be provided to not only the first embodiment, but also to all the modified versions of the first embodiment.

Second Embodiment

A total-focus imaging apparatus implemented by the second embodiment pursues real-time display (that is, a speedy and prompt display) of a moving image brought to a focus on the liquid-crystal display unit 5. As shown in FIG. 1, the configuration of the total-focus imaging apparatus implemented by this second embodiment is all but the same as the configuration of the second modified version of the first embodiment except for differences in software used in the image processing circuit 42 and the control circuit 43.

The total-focus imaging apparatus implemented by the second embodiment is characterized in that an in-focus determination process of pixels is carried out by the image processing circuit 42 in real-time manner and pixels brought to a focus are updated by the control circuit 43 in order to display an image brought to a focus on the liquid-crystal display unit 5.

In the total-focus imaging apparatus implemented by the second embodiment, each time an image is fetched from the CCD element 31, the image processing circuit 42 carries out an in-focus determination process of pixels by detecting inversion of the polarity of differences in pixel luminance between images at focal positions different from each other. If an in-focus pixel on an image is detected, the in-focus pixel is used to update a segment of the pixel stored in the image memory, 41. In a storage image segment of the image memory, 41 for storing an image brought to a focus, a most recent in-focus image comprising pixels brought to a focus is formed in real-time manner in this way.

Every time this most recent image brought to a focus is updated by in-focus pixels, the image is displayed on the liquid-crystal display unit 5. That is, each time an image of an object of observation is taken, a moving image with all portions of the object of observation brought to a focus is presented in an almost real-time manner without waiting for completion of an imaging operation of one set of image data comprising a number of images with their focal positions slightly different from each other.

In addition, since the configuration of this embodiment puts an emphasis on the importance of the real-time characteristic to the observation, it is necessary to carry out a scanning operation of the focal position and an operation to take a number of images while the position of the focus is being scanned in a short period of time. Thus, while the focal position of the variable-focus lens unit 1 is being moved continuously instead of being moved in accordance with a stepwise movement pattern, the image-pickup operation of the CCD element 31 is operated continuously at high speeds as long as the exposure performance of the element permits.

As described above, in the total-focus imaging apparatus implemented by this embodiment, each time an image is taken in a shortest period of time, an in-focus image comprising most recent pixels each brought to a focus is presented on the liquid-crystal display unit 5 in a semi-real-time manner, exhibiting an effect of a substantially improved real-time characteristic.

It should be noted that, since the hardware configuration of the total-focus imaging apparatus implemented by the second embodiment is identical with that of the first embodiment, the software of the image processing circuit 42 and the control circuit 43 in the second embodiment can be replaced by the software of the first embodiment by typically operations carried out by the observer. Thus, the total-focus imaging apparatus implemented by the second embodiment is capable of carrying out not only processing required to strictly meet real-time requirements, but also the same operation as the first embodiment. Therefore, the total-focus imaging apparatus implemented by the second embodiment exhibits a multi-functional effect in comparison with the first embodiment at almost the same price as the first embodiment except for an increase in cost incurred in the addition of the software of the first embodiment to the second embodiment.

(Modifications)

A first modified version of the second embodiment implements a total-focus imaging apparatus wherein the image memory, 41 is implemented by a RAM with a small storage capacity sufficient only for storing an image. That is, the first modified version does not require the image memory, 41 with as large a capacity as the image memory, 41 of the total-focus imaging apparatus of the second embodiment for storing a number of images.

Instead, this modified version is capable of functioning by using only the image memory, 41 with storage capacity enough only for storing an image. Thus, the image memory, 41 can be implemented by a small and low-cost RAM (line memory). Since the configuration can be implemented to include a low-cost the image memory, 41, the modified version exhibits a cost-down effect which allows the total-focus imaging apparatus to be produced at a cost lower than the first embodiment even though this modified version cannot perform as well as the first embodiment does. In addition, since the memory board is smaller in size, the total-focus imaging apparatus exhibits an effect of a smaller weight than the first embodiment.

It should be noted that, in this modified version, the image memory, 41 can also be implemented as a dedicated image RAM attached to the liquid-crystal display unit 5.

The total-focus imaging apparatus implemented by the second embodiment can be modified in the same ways as the second modified version of the first embodiment is modified into the first embodiment, the first modified version of the first embodiment and the ninth to twelfth modified versions of the first embodiment to exhibit their respective peculiar functional effects.

Third Embodiment

The configuration of a total-focus imaging apparatus implemented by the third embodiment is about the same as the configuration of the first embodiment shown in FIG. 1.

It should be noted, however, that in the total-focus imaging apparatus implemented by the third embodiment, the imaging process shown in FIG. 3 is carried out only once. Information showing a focal position is added to each of a number of images with their focal positions slightly different from each other as shown in FIG. 4 and the images are stored in the image memory, 41 along with the information. The software of the control circuit 43 is designed to implement this scheme. The information showing a focal position is generated from a signal which specifies an applied voltage and is transmitted from the control circuit 3 to the variable-focus lens driving circuit 2. This information is a value indicating the distance from the variable-focus lens unit 1 to the in-focus plane F shown in FIG. 1.

In addition, the software of the control circuit 43 includes a function to create a three-dimensional stereo numerical model of an observation object based on horizontal and vertical coordinates of pixels brought to a focus and information on focal positions. The image processing circuit 42 has a focal position detection function for computing information on a focal position of the variable-focus lens unit 1 on the basis of a signal provided by the control circuit 43 to the variable-focus lens driving circuit 2 which serves as driving means. Then, the image processing circuit 42 determines which pixel on each of the images with different focal positions is brought to a focus whereas the control circuit 43 provides information on a focal position to the pixel determined to be a pixel brought to a focus and synthesizes information on the position of the pixel on a plane and information on the height.

In this way, pieces of positional information, that is, the horizontal and vertical coordinates and the height of pixels brought to a focus are collected for synthesis of a stereo numerical model showing the stereo shape of the observation object. The control circuit 43 then stores the stereo numerical model in another image segment of the image memory, 41.

Figure 21:
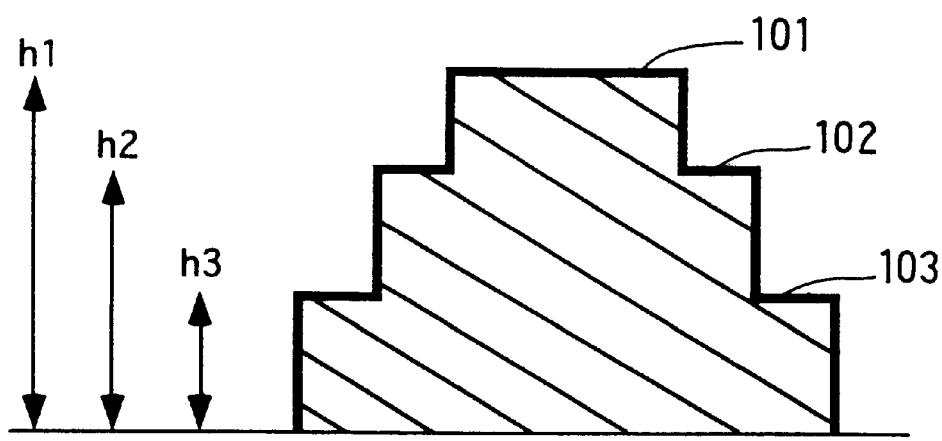
FIG. 21 is a diagram showing a cross section of an observation object used in a third embodiment of the present invention.

As a result, it is possible to display a stereo diagram of an observation object based on the stereo numerical model of the observation object in a variety of display formats on the liquid-crystal display unit 5. If a line segment is set to cross an image brought to a focus by using a mouse provided as an accessory device of an operation unit employed in the total-focus imaging apparatus, for example, it will be possible to display a diagram showing a cross section cutting 3 cylinders of FIG. 22 vertically along the line segment as shown in FIG. 21 on the liquid-crystal display unit 5.

Figure 22:
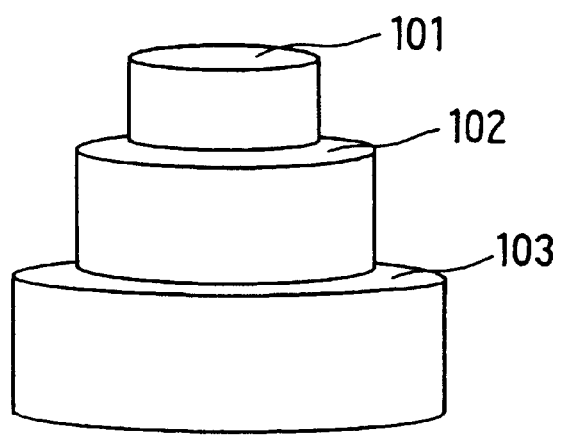
FIG. 22 is a diagram showing a crane-shot image of an observation object used in the third embodiment.

As an alternative, by determining a proper dip in advance, it is also possible to display a moving image on the liquid-crystal display unit 5 as if a crane-shot image of the observation object is looked at from the entire circumference continuously as shown in FIG. 22. In addition, by using the same means, it is also possible to display a moving image with a dip or a stereo angle thereof varying continuously on the liquid-crystal display unit 5.

Thus, the total-focus imaging apparatus implemented by this embodiment is capable of creating a stereo numerical model of an observation object, exhibiting an effect of an ability to allow the user to grasp the shape of the observation object with ease by viewing a variety of stereo displays.

It should be noted that the hardware configuration of the total-focus imaging apparatus implemented by this embodiment is generally identical with that of the first embodiment even though the software configuration is not. Thus, the same processing as the first embodiment can be carried out by this apparatus by operating a switch or the like. As a result, an image brought to a focus can be obtained as is the case with the first embodiment.

(First Modification)

In the total-focus imaging apparatus implemented by this embodiment, the function to create a stereo numerical model is of importance to the apparatus. Thus, there may be raised a demand for measurement of the focal position (that is, the position of the in-focus plane F) with a high degree of accuracy for each image and for measurement of the shape of an observation object in the vertical direction with a high degree of precision. For this reason, there is provided a first modified version of the third embodiment for implementing a total-focus imaging apparatus with a configuration wherein a pressure sensor shown in none of the figures is provided for measuring the pressure of transparent liquid inside the sealed liquid lens 1 shown in FIG. 1 so as to allow the frequency of the sealed liquid lens 1 to be measured with a high degree of precision.

The total-focus imaging apparatus implemented by this modified version has an effect of an ability to measure the position of the focal position F with a high degree of accuracy for each image and measuring the shape of an observation object in the vertical direction with a high degree of precision.

It should be noted that the pressure sensor can be provided with a temperature compensation function for improving the precision of the measurement of the focal position F. As an alternative, it is also possible to provide a measurement device for directly measuring the distortion or the curvature of the transparent elastic film forming the sealed liquid lens 1 so as to pursue an even higher degree of precision.

(Second Modification)

A second modified version of the third embodiment implements a total-focus imaging apparatus wherein computation of the focal position of the variable-focus lens unit 1 is not based on a signal output by the control circuit 43 to the variable-focus lens driving circuit 2, but based on a value of measurement generated by a pressure sensor.

Specifically, this modified version further has a pressure sensor for measuring a pressure applied by the variable-focus lens driving circuit 2 to the piezoelectric actuators 12 whereas the image processing circuit 42 has a focal position detection function for computing the focal position of the variable-focus lens unit 1 based on a value of measurement generated by this pressure sensor which is not shown in the figures.

As described above, this modified version computes the focal position of the variable-focus lens unit 1 based on a measured value of the pressure applied by the variable-focus lens driving circuit 2 to the piezoelectric actuators 12. This is because the focal position of the variable-focus lens unit 1 is determined by the shape of the sealed liquid lens 1 which is determined by the displacement of the piezoelectric actuators 12 which is determined by the applied voltage. Thus, the focal position of the variable-focus lens unit 1 can be computed from a measured value of the pressure applied by the variable-focus lens driving circuit 2 to the piezoelectric actuators 12. As a result, information on the position of the focus can be provided to each of a number of images taken at focal positions different from each other.

Thus, in addition to the effects exhibited by the third embodiment, this modified version has an effect of an ability to provide information on the focal position of the variable-focus lens unit based on a value of measurement to each image and an ability to create an accurate stereo numerical model.

(Third Modification)

A third modified version of the third embodiment implements a total-focus imaging apparatus wherein computation of the focal position of the variable-focus lens unit 1 is not based on a signal output by the control circuit 43 to the variable-focus lens driving circuit 2, but based on a value of measurement generated by an electric-charge-amount sensor.

Specifically, this modified version further has an electric-charge-amount sensor for measuring the amount of electric charge injected or discharged to the piezoelectric actuators 12 whereas the image processing circuit 42 has a focal position detection function for computing the focal position of the variable-focus lens unit 1 based on a value of measurement generated by this electric-charge-amount sensor which is shown in none of the figures.

As described above, this modified version computes the focal position of the variable-focus lens unit 1 based on a measured amount of electric charge injected or discharged to the piezoelectric actuators 12. This is because the focal position of the variable-focus lens unit 1 is determined by the shape of the sealed liquid lens 1 which is determined by the displacement of the piezoelectric actuators 12 which is determined by the amount of such electric charge. Thus, the focal position of the variable-focus lens unit 1 can be computed from a measured amount of electric charge injected or discharged to the piezoelectric actuators 12. As a result, information on the position of the focus can be provided to each of a number of images taken at focal positions different from each other.

Thus, in addition to the effects exhibited by the third embodiment, this modified version has an effect of an ability to provide information on the focal position of the variable-focus lens unit based on a value of measurement to each image and an ability to create an accurate stereo numerical model.

(Fourth Modification)

A fourth modified version of the third embodiment implements a total-focus imaging apparatus wherein computation of the focal position of the variable-focus lens unit 1 is not based on a signal output by the control circuit 43 to the variable-focus lens driving circuit 2, but based on a value of measurement generated by a displacement sensor.

Specifically, this modified version further has a displacement sensor for measuring the displacement of the piezoelectric actuators 12 whereas the image processing circuit 42 has a focal position detection function for computing the focal position of the variable-focus lens unit 1 based on a value of measurement generated by this displacement sensor which is not shown in the figures.

As the displacement sensor for measuring the displacement of the piezoelectric actuators 12, it is desirable to employ a distortion gage provided on the surface of a piezoelectric bimorph material or a piezoelectric unimorph material of the piezoelectric actuators 12 to form an integrated assembly therewith in order to meet a demand for a compact size. For details of such a distortion gage, reference may be had to JP application No. 10-246198.

As described above, this modified version computes the focal position of the variable-focus lens unit 1 based on a measured value of the displacement of the piezoelectric actuators 12. This is because the focal position of the variable-focus lens unit 1 is determined by the shape of the sealed liquid lens 1 which is determined by the displacement of the piezoelectric actuators 12. Thus, the focal position of the variable-focus lens unit 1 can be computed from a measured value of the displacement of the piezoelectric actuators 12. As a result, information on the position of the focus can be provided to each of a number of images taken at focal positions different from each other.

Thus, in addition to the effects exhibited by the third embodiment, this modified version has an effect of an ability to provide information on the focal position of the variable-focus lens unit based on a value of measurement to each image and an ability to create an accurate stereo numerical model.

(Fifth Modification)

A fifth modified version of the third embodiment implements a total-focus imaging apparatus wherein the image processing circuit 42 serves as a digital processing circuit for creating an image brought to a focus and a stereo numerical model, including a noise elimination filter for eliminating noise with high spatial frequencies during generation of a stereo numerical model.

Figure 23:
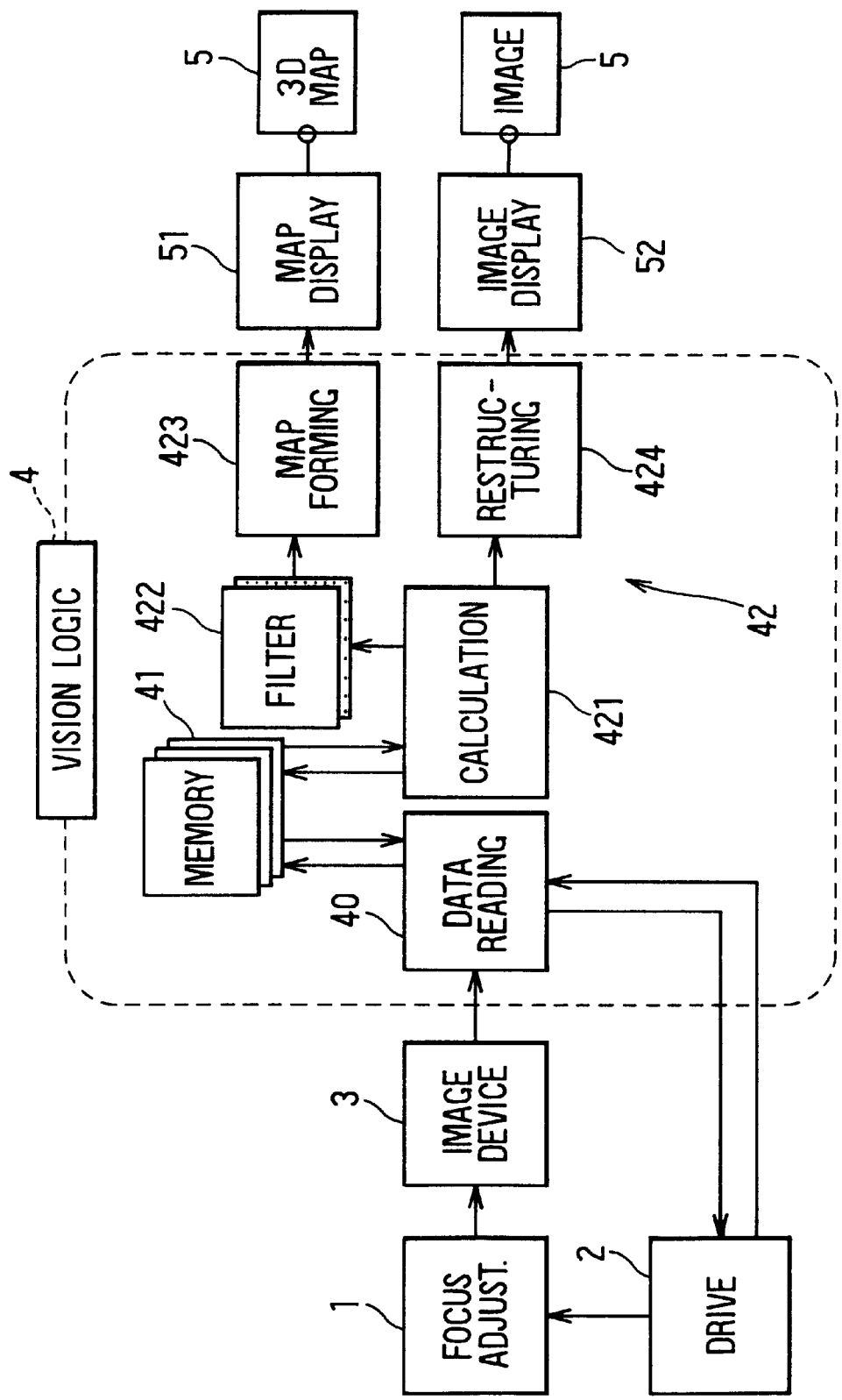
FIG. 23 is a block diagram showing a noise elimination filter employed in a fifth modified version of the third embodiment.

FIG. 23 is a block diagram showing the overall configuration of the total-focus imaging apparatus implemented by this modified version. FIG. 23 is no more than a diagram showing the configuration of the first embodiment in terms of blocks. Details of the configuration are explained later in a description of a fourth embodiment. It should be noted, nevertheless, that the image processing circuit 42 is characterized as follows.

As shown in FIG. 23, the image processing circuit 42 comprises a total-focus calculation logic circuit 421, a noise elimination filter 422, a three-dimensional map forming logic circuit 423 and an image-data restructuring logic circuit 424. The configuration of this modified version is different from that of the first embodiment in that the image processing circuit 42 has the noise elimination filter 422 provided between the total-focus calculation logic circuit 421 for determining an in-focus state and the three-dimensional map forming circuit 423 for generating a stereo numerical model to be relied on.

Figure 24:
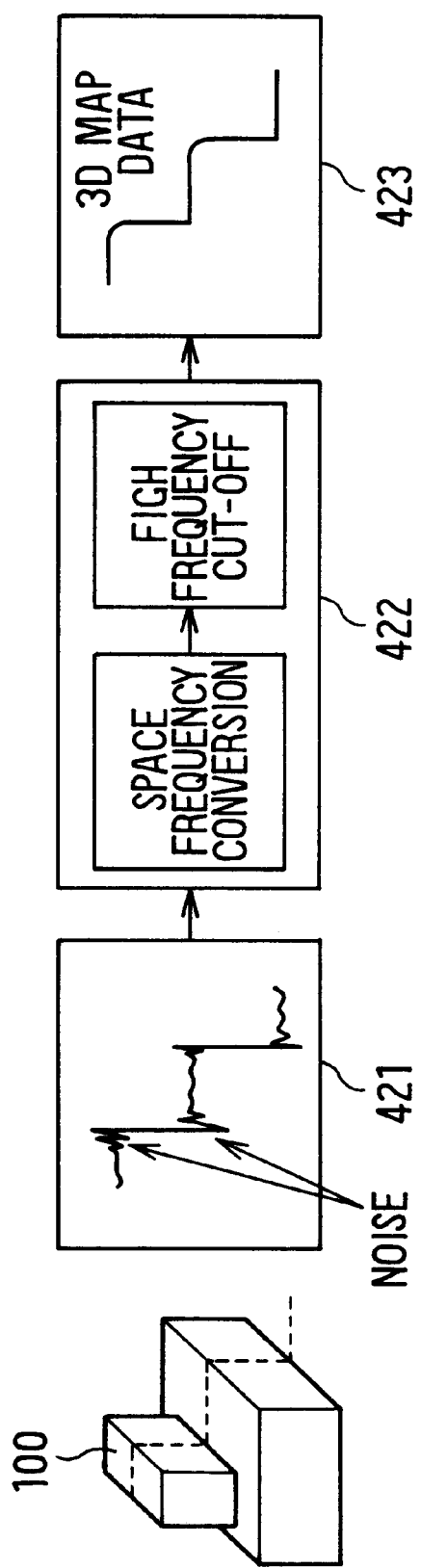
FIG. 24 is a model diagram showing an effect of the noise elimination filter employed in the fifth modified version of the third embodiment.

If an image is processed without the noise elimination filter 422 as is the case with the first embodiment, at a portion with an abrupt change in in-focal position such as an edge or a stair portion of the observation object shown in FIG. 24, the in-focus determination process is prone to an error which is observed as a high space frequency component. As a result, an edge, a stair portion or the like of the stereo numerical model appears as a nail in the total-focus calculation logic circuit 421 due to the high space frequency noise, forming a disorder not existing in the object of observation in data of the stereo numerical model.

In order to solve this problem, this modified version employs the noise elimination filter 422 also as shown in FIG. 24 for eliminating high space frequency components in order to eliminate high space frequency noise from the stereo numerical model. As a result, a stereo numerical model of an observation object can be displayed smoothly and accurately as shown in the three-dimensional map forming circuit 423.

In the noise elimination filter 422, a stereo numerical model is subjected to discrete cosine transformation to transform the model into components in a space frequency area, a low-pass filtering and inverse transformation in order to reconstruct the stereo numerical model without a nail caused by high space frequency noise. That is, the noise elimination filter 422 is a digital filter for carrying a normal-transformation process to first transform a stereo numerical model into space frequency components, a filtering process to eliminate high space frequency components from the space frequency components and an inverse-transformation process to restore the space frequency components back to a stereo numerical model.

By subjecting the space frequency components to the filtering process, it is possible to eliminate only high space frequency components containing much noise from the space frequency components. In addition, since a variety of techniques can be adopted in the filtering process, the number of effective selections increases.

In addition, the noise elimination filter 422 adopts the discrete cosine transformation technique in the normal and inverse-transformation processes. Thus, since the noise elimination filter 422 may employ an MPEG compression processing LSI and an MPEG decompression processing LSI which is available in the market, the development time and the cost can be reduced.

Thus, the total-focus imaging apparatus implemented by this modified version of the third embodiment has an effect of an ability to make a stereo numerical model smooth and accurate even in the case of an observation object having a step portion or an edge in addition to the effects exhibited by the third embodiment.

(Sixth Modification)

A sixth modified version of the third embodiment implements the same total-focus imaging apparatus as the fifth embodiment except that the configuration of the noise elimination filter 422 shown in FIG. 23 is simplified. In this modified version, the noise elimination filter 422 is a digital filter for removing harmonic noise by eliminating a mobile average for a stereo numerical model.

That is, this modified version is different from the fifth modified version in that, in the case of the former, a stereo numerical model is not subjected to a normal-transformation process to transform the model into space frequency components and filtered space frequency components are not subjected to an inverse-transformation process to restore the filtered space frequency components back to a stereo numerical model. Thus, since neither the normal-transformation process nor the inverse-transformation process is carried out, the processing load can be decreased considerably, the speed of the filtering process of the stereo numerical model can be increased substantially and the cost of the product can be reduced.

Thus, the total-focus imaging apparatus implemented by this modified version of the third embodiment has an effect of an ability to increase the speed of the filtering process of the stereo numerical model substantially and to reduce the cost of the product in addition to the effects exhibited by the fifth modified version.

(Seventh Modification)

Much like the sixth modified version, a seventh modified version of the third embodiment implements the same total-focus imaging apparatus as the fifth modification except that the configuration of the noise elimination filter 422 shown in FIG. 23 is simplified.

In this modified version, however, the noise elimination filter 422 is a digital filter for processing an image signal for each image segment comprising a plurality of pixels by making each image signal uniform for each pixel in the image segment as determined by the luminance generated most frequently in the image segment, that is, much like the sixth modified version, a stereo numerical model is not subjected to a normal-transformation process to transform the model into space frequency components and filtered space frequency components are not subjected to an inverse-transformation process to restore the filtered space frequency components back to a stereo numerical model.

In addition, since each image signal is merely made uniform for each pixel in a predetermined image segment as determined by the luminance generated most frequently in the image segment, the processing load of the image processing circuit 42 can be decreased. As a result, the processing load can be decreased considerably, the speed of the filtering process of the stereo numerical model can be increased substantially and the cost of the product can be reduced.

Thus, the total-focus imaging apparatus implemented by this modified version of the third embodiment has an effect of an ability to increase the speed of the filtering process of the stereo numerical model substantially and to reduce the cost of the product as is generally seen in the sixth modified version.

The total-focus imaging apparatus implemented by this embodiment can also be modified in the same way as the first embodiment is modified to the variety of modified versions and the first embodiment is modified to the second embodiment or to the modified version of the second embodiment.

Fourth Embodiment

Figure 25:
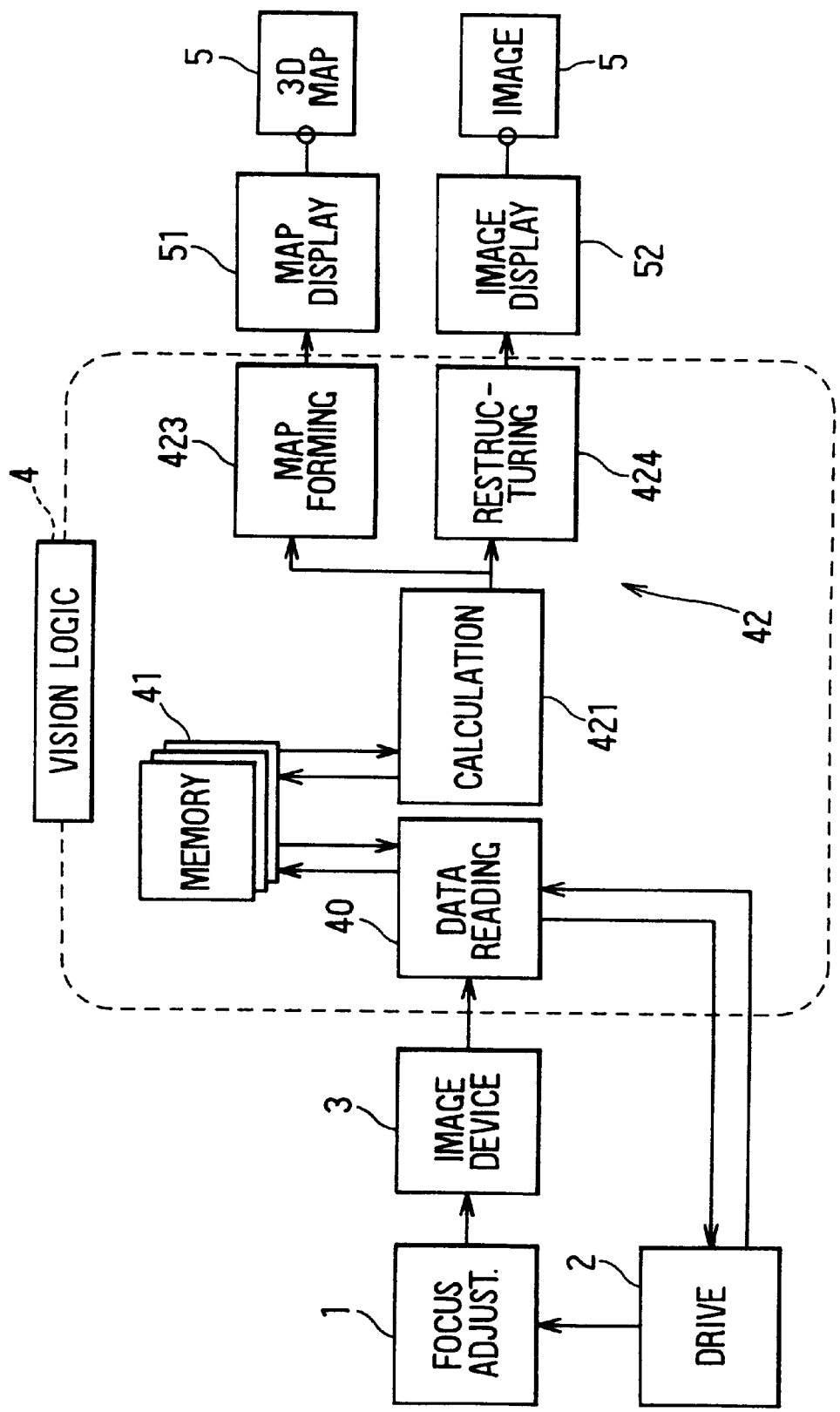
FIG. 25 is a block diagram showing the configuration of a total-focus imaging apparatus implemented by a fourth embodiment of the present invention.

As shown in FIG. 25, a total-focus imaging apparatus implemented by the fourth embodiment of the present invention comprises a variable-focus lens unit 1, a variable-focus lens driving circuit 2 and an image-pickup device 3. In the figure, the variable-focus lens unit 1, the variable-focus lens driving circuit 2 and the image-pickup device 3 are referred to as a high-speed focusing adjustment mechanism, a focusing-adjustment driving circuit and a solid-state image-pick up device, respectively. The total-focus imaging apparatus implemented by this embodiment also includes a microcomputer 4, a three-dimensional map display circuit 51, an in-focus-image display circuit 52 not shown in FIG. 1 and a liquid-crystal display unit 5. In FIG. 25, the microcomputer 4 is referred to as a total-focus vision logic unit.

The microcomputer 4 has an image-data reading logic circuit 40, the image memory, 41 and an image processing circuit 42. The image processing circuit 42 has a total-focus calculation logic circuit 421, a three-dimensional map forming circuit 423 and an image-data restructuring logic circuit 424.

Since the total-focus imaging apparatus implemented by this embodiment is characterized by features of the total-focus calculation logic circuit 421 in comparison with the first embodiment, functional effects of the embodiment are explained by focusing on the functional effects of the total-focus calculation logic circuit 421.

The total-focus calculation logic circuit 421 is logic for determining an in-focus state. Based on detection of a maximum and a minimum of luminance values of pixels in an in-focus state, the in-focus determination process of the image processing circuit 42 is really carried out by the total-focus calculation logic circuit 421 by detecting polarity inversion of differences in pixel luminance between images at different focal positions.

Figure 26:
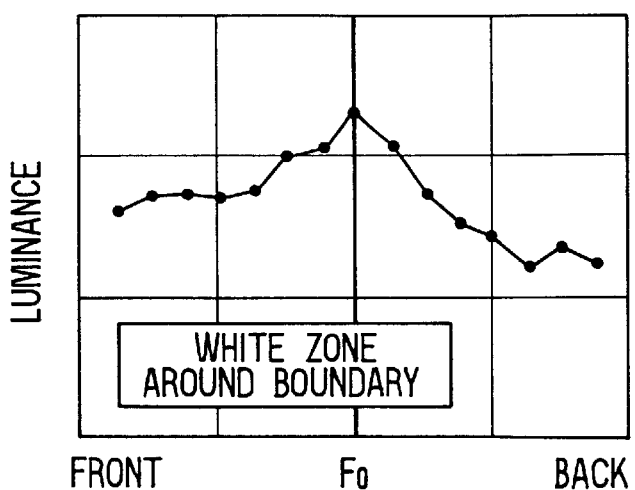
FIG. 26 is a graph showing changes in pixel luminance with the position of the focus.

Specifically, if a specific pixel subjected to an in-focus determination process on a particular image brought to a focus has a stronger luminance than pixels surrounding the specific pixel, the luminance of the specific pixel is also stronger than pixels corresponding to the specific pixel on images preceding and succeeding the particular image. Thus, the luminance of the specific pixel is a maximum value among the pixels corresponding to the specific pixel on the preceding and succeeding images. Particular attention is directed to a specific bright spot in close proximity to a border between a white (bright) portion and a black (dark) portion shown in FIG. 26 for example.

As shown in the figure, when the particular image is brought to a focus, the luminance of the specific bright spot becomes a peak among spots corresponding to this specific bright spot on preceding and succeeding images. Thus, when the luminance of each of these spots on the particular image and images immediately preceding and immediately succeeding the particular image are examined, the difference in spot luminance between the particular image and the immediately preceding image has a positive polarity while the difference in spot luminance between the immediately succeeding image and the particular image has a negative polarity. In this way, an in-focus state of a pixel can be determined by detecting polarity inversion of differences in pixel luminance between images at different focal positions.

On the other hand, if a specific pixel subjected to an in-focus determination process on a particular image brought to a focus has a weaker luminance than pixels surrounding the specific pixel, the luminance of the specific pixel is also weaker than pixels corresponding to the specific pixel on images preceding and succeeding the particular image. Thus, the luminance of the specific pixel is a minimum value among the pixels corresponding to the specific pixel on the preceding and succeeding images.

Figure 27:
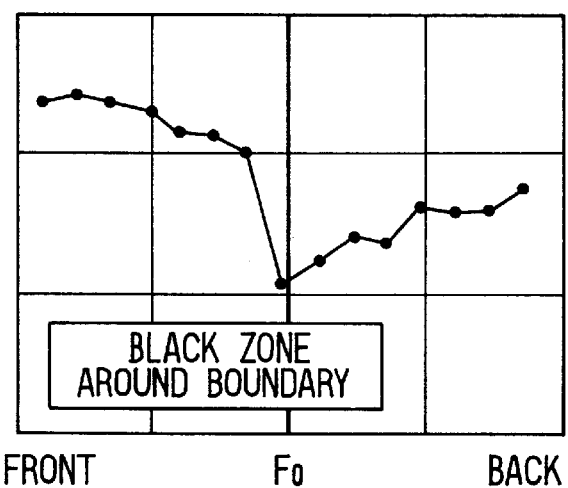
FIG. 27 is a graph showing changes in pixel luminance with the position of the focus.

Reference is now had to a specific dark spot in close proximity to a border between a white (bright) portion and a black (dark) portion shown in FIG. 27 for example. As shown in the figure, when the particular image is brought to a focus, the luminance of the specific bright spot becomes a bottom among spots corresponding to this specific bright spot on preceding and succeeding images. Thus, when the luminance of each of these spots on the particular image and images immediately preceding and immediately succeeding the particular image are examined, the difference in spot luminance between the particular image and the immediately preceding image has a negative polarity while the difference in spot luminance between the immediately succeeding image and the particular image has a positive polarity. In this way, an in-focus state of a pixel can be determined by detecting polarity inversion of differences in pixel luminance between images at different focal positions.

Figure 28:
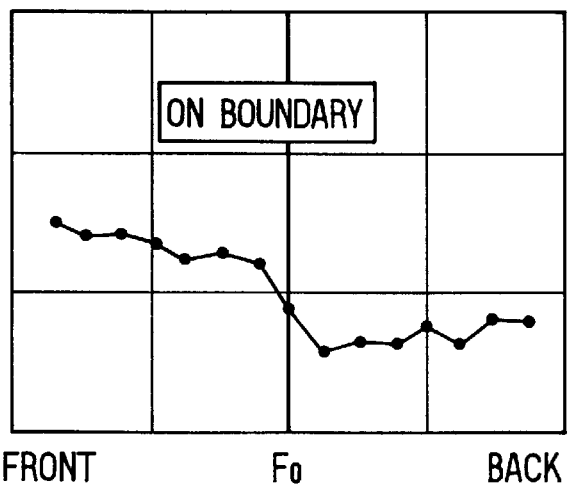
FIG. 28 is a graph showing changes in pixel luminance with the position of the focus.

Regarding a spot which is subjected to an in-focus determination process and located just on the border between the bright and dark portions of a particular image, the luminance of such a spot does not become a maximum value or a minimum value when the particular image is brought to a focus. Instead, the rate of change in luminance at the spot becomes a maximum as shown in FIG. 28. Thus, naturally, the location of such a spot is examined to determine whether or not the spot is right on the border between the bright and dark portions.

Then, if the spot is right on the border between the bright and dark portions, the rate of change in luminance at the spot is checked to determine whether it is a maximum or not in order to determine whether the spot is at an in-focal position (Fo). Accordingly, however, the processing load will increase. In order to solve the problem of the increased processing load, this embodiment employs simplified in-focus determination logic explained as follows.

Figure 29:
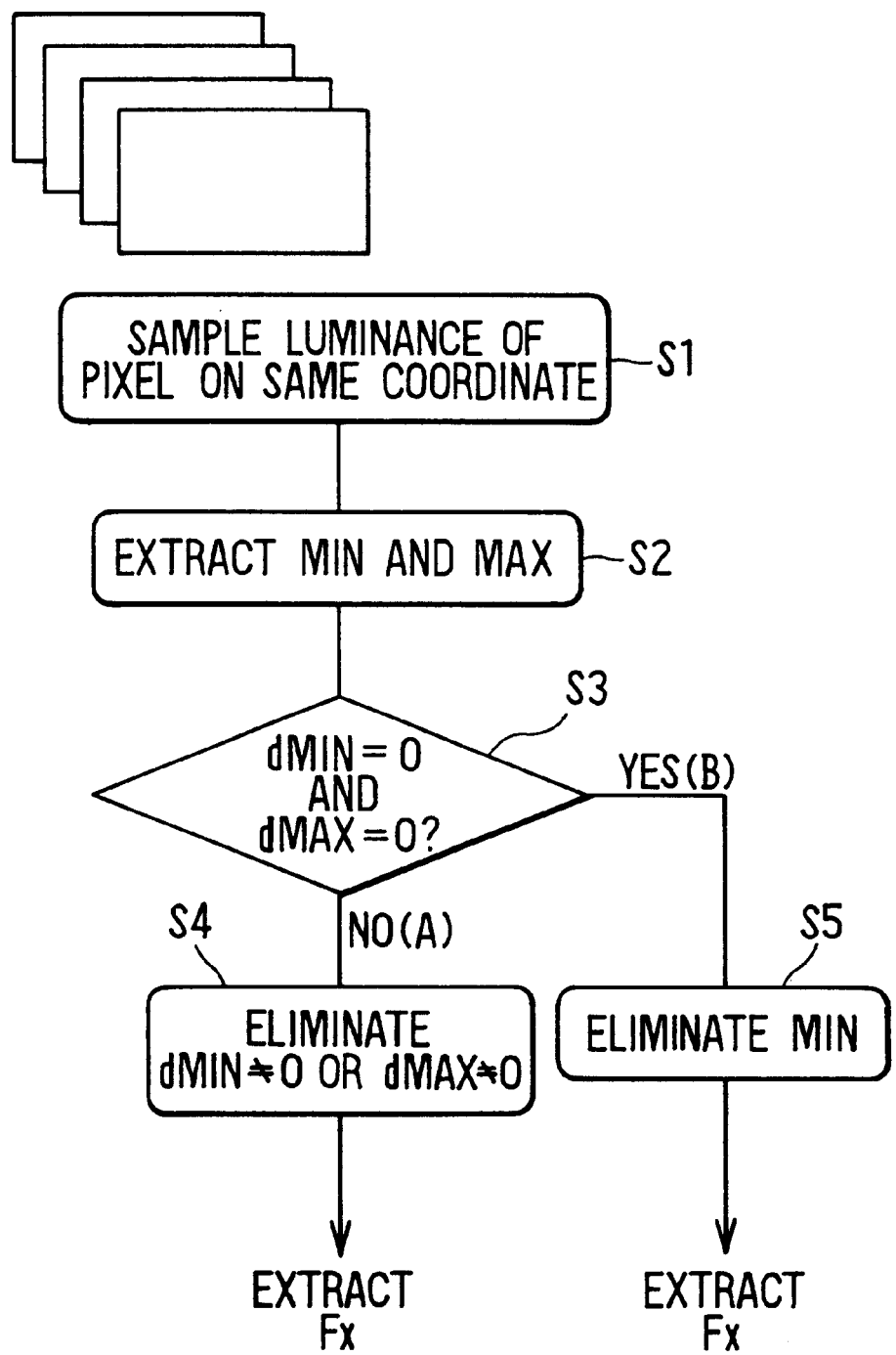
FIG. 29 is a flow diagram representing in-focus determination logic embraced in the fourth embodiment.

The image processing circuit 42 employed in this embodiment determines an in-focus state in accordance with simple in-focus determination logic represented by a flowchart shown in FIG. 29. As shown in the figure, the flowchart begins with a processing step S1 at which luminance values of pixels at the same coordinates on a plurality of images with focal positions different from each other are sampled from the image memory, 41. At a next step S2 a maximum value MAX and a minimum value MIN are extracted from the sampled values. Then, at a processing step S3, differences (dMAX and dMIN) in luminance value at focal positions corresponding to the maximum and minimum values are examined to determine whether the polarity of each of the differences at the focal positions is inverted.

If the polarity of a difference in luminance at the focal position corresponding to the maximum value or the minimum value is not inverted, the maximum value or the minimum value is not a true positive peak or a true negative peak value respectively. In this case, the flow of the logic goes on to a processing step S4 to carry out in-focus determination A based on the focal position at which a true peak value of the luminance is observed. That is, dMIN≠0 or dMAX≠0 is discarded or eliminated to extract Fx.

If the polarity of a difference in luminance at the focal position corresponding to the maximum value and the polarity of a difference in luminance at the focal position corresponding to the minimum value are both inverted, on the other hand, the maximum value and the minimum value are both true positive and negative peak values respectively. In this case, the flow of the logic goes on to a processing step S5 to carry out in-focus determination B based on typically the focal position at which the positive true peak value of the luminance is observed and the negative peak value MIN is discarded or eliminated. It should be noted that, the in-focus determination at the processing step Scan also be based on the focal position at which the negative true peak value of the luminance is observed and the positive peak value is discarded instead. That is, the in-focus determination at the processing step S5 can be based on either of the focal positions.

Examples of the simple in-focus determination are shown in FIG. 30. In the case of in-focus determination B, an erroneous result of determination may be obtained as indicated by notation NG in the figure. From a standpoint supported by results of experiments conducted by the inventors, however, an erroneous in-focal position is close enough to the correct in-focal position in many cases. Thus, virtually no remarkable error is caused by the in-focus determination logic.

In addition, since an in-focal position of a pixel on a boundary line between a bright portion and a dark portion is determined incorrectly in many cases, almost no difference is seen regardless of whether the pixel appears as a black or white pixel on an image brought to a focus provided that the pixel is sufficiently thin. Thus, there is almost no problem seen on the image brought to a focus. In a stereo numerical model, on the other hand, an error appears on a border line between a bright portion and a dark portion and such an error causes high space frequency noise. By employing the noise elimination filter 422, however, such noise can be eliminated.

As described above, in the total-focus imaging apparatus, an in-focus determination process can be carried out for each pixel by using very simple determination logic based on variations in luminance of a specific pixel alone without referring to a correlation between the luminance of the specific pixel and the luminance of any surrounding pixel. That is, by observing variations in luminance of a pixel subjected to an in-focus determination process, inversion of the polarity of differences in pixel luminance can be interpreted as an in-focus condition. Thus, the processing load of the in-focus determination process carried out for a pixel in the image processing circuit 42 employed in this embodiment is reduced substantially. As a result, the real-time performance of the image processing can be improved and a low-cost image processing circuit can be adopted.

Accordingly, the total-focus imaging apparatus implemented by this embodiment exhibits an effect of an improved real-time characteristic of the image processing and reduction of the cost of the image processing circuit 42 almost similarly to the first embodiment.

(Modifications)

The total-focus imaging apparatus implemented by this fourth embodiment can also be changed to modified versions in the same ways as the first embodiment is changed to the modified versions thereof. In addition, the total-focus imaging apparatus implemented by this fourth embodiment can also be changed to modified versions in the same ways as the first embodiment is changed to the second embodiment, the third embodiment and their modified versions.

Fifth Embodiment

A capability of determining an in-focus condition of each pixel or each image segment is required for creation of an image with all portions of an observation object completely brought to a focus through selection of an in-focus image and generation of a stereo numerical model based on an in-focal position. If there is neither luminance contrast nor color contrast with the surroundings even if the position varies in the optical direction, that is, even if a difference in altitude exists, however, the in-focus determination process cannot be carried out with a high degree of accuracy. As a result, an in-focal position cannot be detected with a high degree of accuracy either.

Under such a condition, in generation of an image brought to a focus, if there is no contrast with the surroundings even if pin blurring exists to a certain degree, an image almost similar to an image brought to a focus is obtained, raising a small problem only. In the creation of a stereo numerical model, however, an error is generated in detection of an in-focal position if the in-focus determination process cannot be carried out with a high degree of accuracy. As a result, a shape representing the stereo numerical model differs from the real object of observation, raising a problem.

In order to solve this problem, the total-focus imaging apparatus implemented by the fifth embodiment is provided with a capability of carrying out an in-focus determination process with a high degree of accuracy even if there is no contrast in the object of observation.

Figure 31:
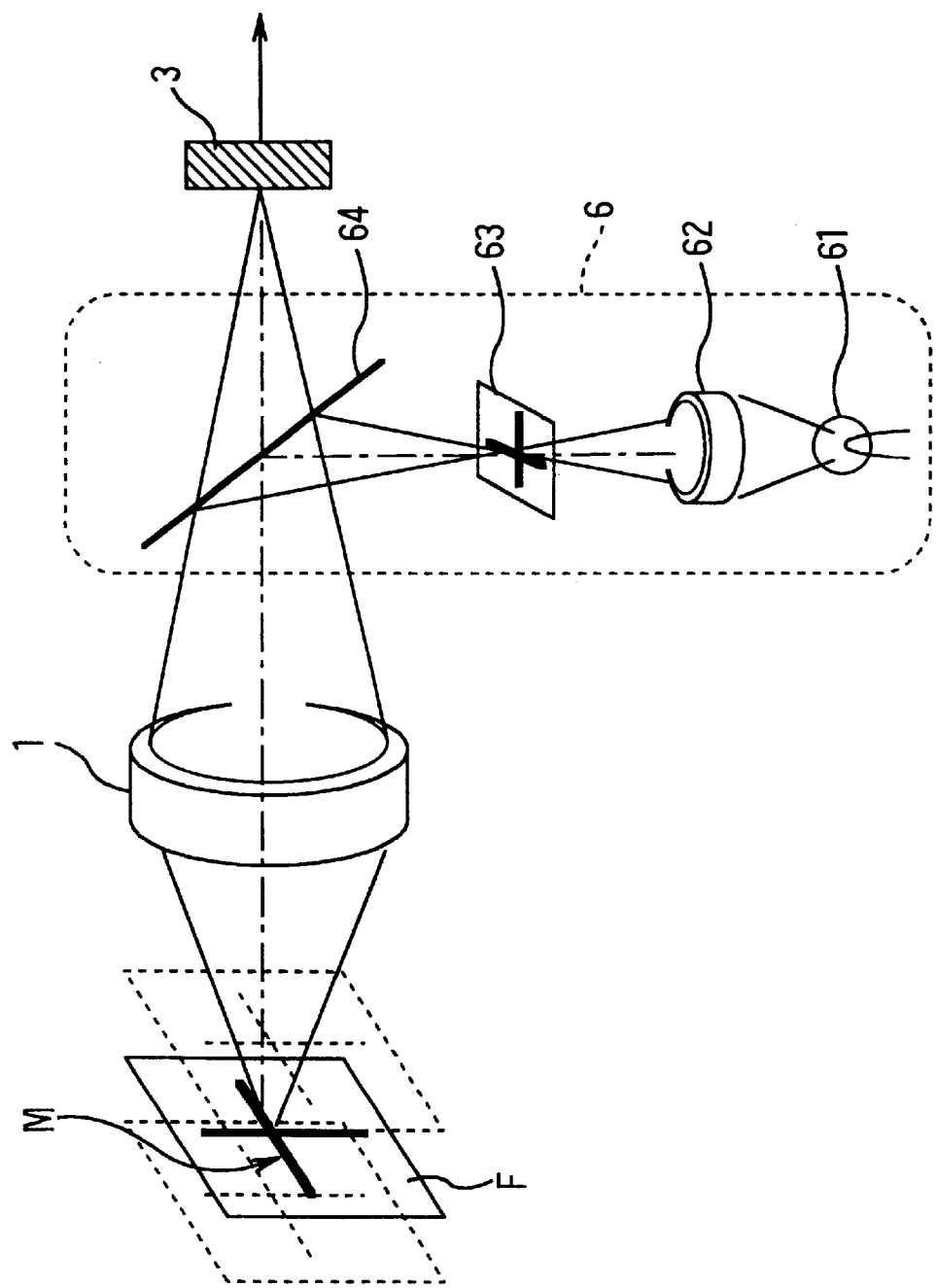
FIG. 31 is a model diagram showing an optical system employed in a total-focus imaging apparatus implemented by a fifth embodiment.

As shown in FIG. 31, the total-focus imaging apparatus implemented by the fifth embodiment further has an optical system as an element in addition to the configuration of the first embodiment and a marker projection device 6 for projecting an optical marker with an image thereof formed at the focal position F on an object of observation.

The marker projection device 6 comprises a point light source 61 used as marker light source, a projection lens 62 for converging a light emitted by the marker light source 61, a mask 63 with a slit cut thereon to form an optical marker with a distinct difference between brightness and darkness and a half mirror 64 for aligning a light generated by the marker optical source 61 to the optical axis of the variable-focus lens unit 1. That is, the marker projection device 6 is for forming a marker projection image M with the same shape as the slit on the mask 63 at a focal position on the optical axis of the variable-focus lens unit 1.

The marker projection device 6 is capable of putting the optical marker in a blinking state by blinking the marker light source 61. Then, the control circuit 43 controls the image-pickup device 3 and the image processing circuit 42 in synchronization with the blinking state of the optical marker to carry out an in-focus determination process in the course of imaging the optical marker and to store image signals into the image memory, while the optical marker is blinking.

The total-focus imaging apparatus implemented by the embodiment has the description described above to exhibit the following functional effects.

The marker projection device 6 forms an image M of an optical marker so as to project the optical marker on an object of observation. That is, the projection image M of the optical marker is clearly projected only on a portion of the observation object located at a focal position F at the imaging time. Thus, the projection image M of the optical marker with sharp contrast is created at least on the surface of the observation object at the focal position F even if the object of observation has a single color with no contrast under ordinary illumination, allowing an in-focus determination process to be carried out with a high degree of accuracy. As a result, by observing an optical marker projected on the surface of the observation object, a stereo numerical model can be created with a high degree of precision.

That is, the in-focus determination process is carried out and an image signal of an in-focus portion of an image brought to a focus is fetched while the optical marker is blinking. As a result, the in-focus determination process can be carried out with a high degree of accuracy even if the object of observation itself has a lack of contrast. Thus, not only can a stereo numerical model be created with a high degree of precision, but an in-focus image with no projection image of an optical marker projected thereon can also be formed as well.

As a result, the total-focus imaging apparatus implemented by this fifth embodiment exhibits an effect of an ability to carry out an in-focus determination process with a high degree of accuracy even if the object of observation itself has a lack of contrast and to form not only a stereo numerical model with a high degree of precision, but also an in-focus image with no projection image M of an optical marker projected thereon in addition to the effects provided by the first embodiment.

(Modification)

The total-focus imaging apparatus implemented by this fifth embodiment can also be changed to modified versions in the same ways as the first embodiment is changed to the variety of modified versions thereof to give characteristics according to their respective configurations. Similarly, the total-focus imaging apparatus implemented by this fifth embodiment can also be changed to modified versions in the same ways as the first embodiment is changed to the second to fourth embodiments and the variety of modified versions thereof to give characteristics according to their respective configurations.

Sixth Embodiment

Figure 32:
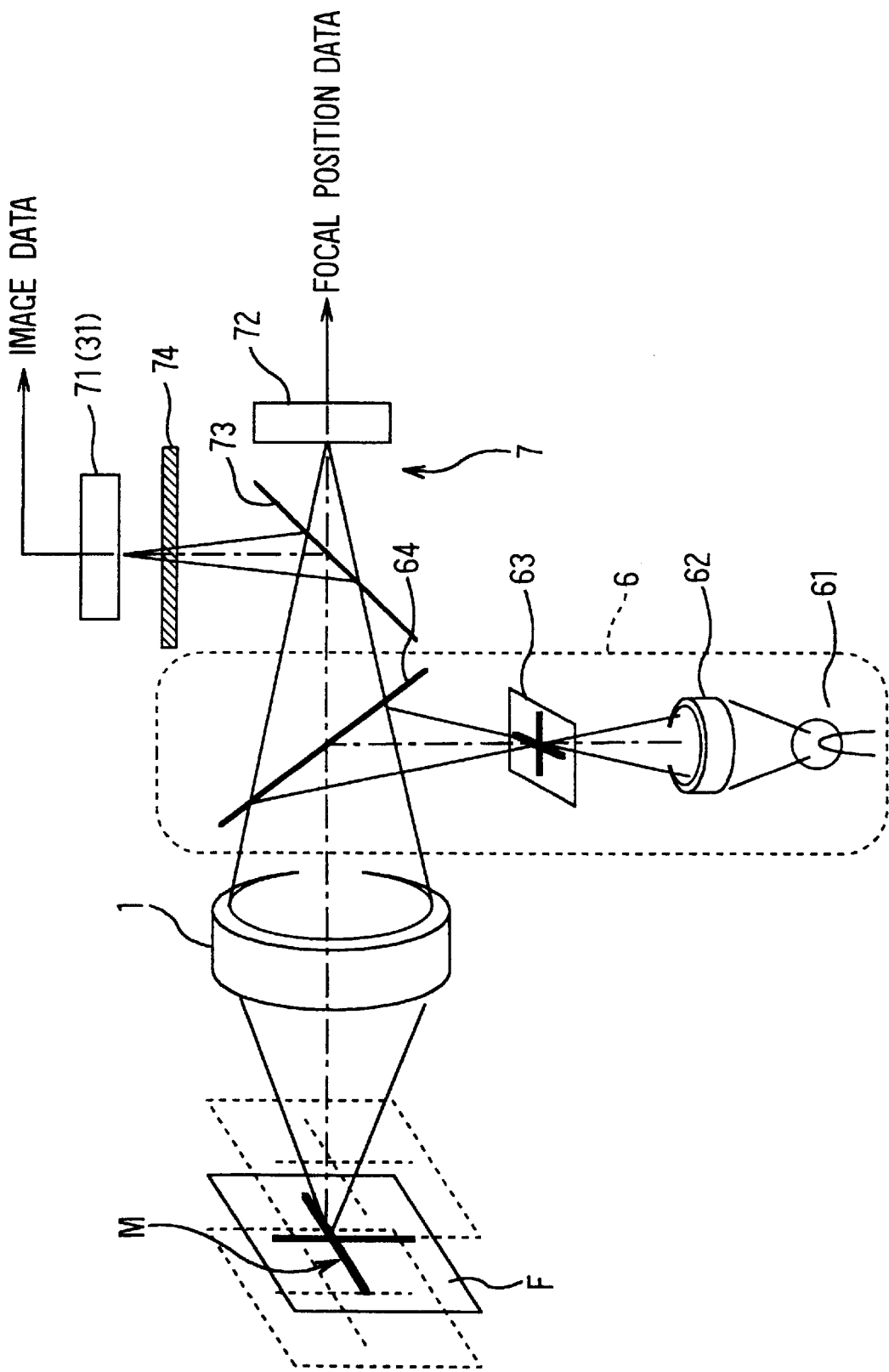
FIG. 32 is a model diagram showing an optical system employed in a total-focus imaging apparatus implemented by a sixth embodiment.

As shown in FIG. 32, the total-focus imaging apparatus implemented by the sixth embodiment further has an optical system as an element in addition to the marker projection device 6 of the fifth embodiment described above and a marker image-pickup device 7.

The marker projection device 6 employed in the sixth embodiment is about the same as that of the fifth embodiment except that, in the case of the former, the marker light source 61 is an LED (light emitting diode) emitting a light at a single wavelength.

On the other hand, the marker image-pickup device 7 comprises a first solid-state image-pickup device 71 corresponding to the CCD element 31 employed in the first embodiment, its half mirror 73, an optical filter 74 and a second solid-state image-pickup device 72 for imaging an object by a beam passing through the half mirror 73. Since the optical filter 74 has a characteristic of blocking only beams in a narrow wavelength band including the wavelength of the marker light source 61, the projection image M of the optical marker is not formed on the first solid-state image-pickup device 71.

In this configuration, the second solid-state image-pickup device 72 has a function to photograph an image of the observation object with the projection image M of the optical marker formed thereon and to output image data for detection of an in-focal position. Since the projection image M of the optical marker is blocked by the optical filter 74, on the other hand, the first solid-state image-pickup device 71 has a function to photograph the object of observation with no optical marker projected thereon and to output image data of a number of images for generating an image brought to a focus.

The total-focus imaging apparatus implemented by the embodiment has the description described above to exhibit the following functional effects.

In this embodiment, by studying the degree of blurring of the optical-marker projection image M photographed by the second solid-state image-pickup device 72 employed in the marker image-pickup device 7, an in-focus determination process can be carried out.

Unlike the fifth embodiment, the projection image M of the optical marker is not projected on an image taken by the first solid-state image-pickup device 71 even if an image brought to a focus is taken with the optical marker put in a blinking state as it is. Thus, it is not necessary to blink the marker light source 61. It is therefore possible to carry out imaging by means of the first solid-state image-pickup device 71 and imaging by means of the second solid-state image-pickup device 72 at the same time. Accordingly, an in-focus determination process and imaging can be performed in a period of time shorter than that of the fifth embodiment. As a result, the time it takes to take an image brought to a focus and to create a stereo numerical model can be shortened in comparison with the fifth embodiment.

Accordingly, in addition to the effects provided by the fifth embodiment, this embodiment also exhibits an effect of a shortened time it takes to take an image brought to a focus and to create a stereo numerical model.

(First Modification)

Figure 33:
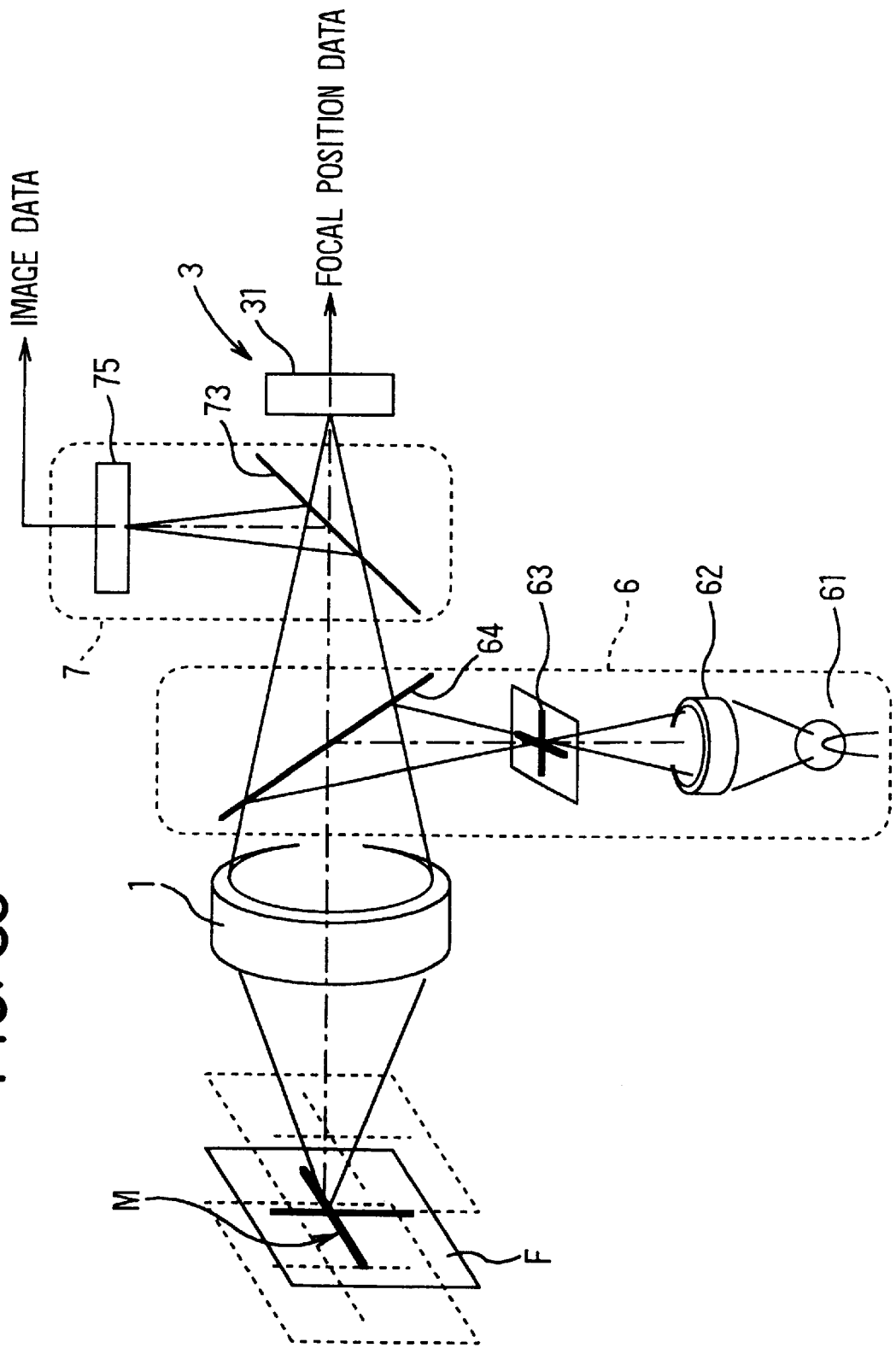
FIG. 33 is a model diagram showing an optical system employed in a total-focus imaging apparatus implemented by a first modified version of the sixth embodiment.

A first modified version of the sixth embodiment implements a simplified configuration of the total-focus imaging apparatus provided by the sixth embodiment as shown in FIG. 33.

In this modified version, the marker projection device 6 projects an optical marker in a wavelength band outside the imaging wavelength band of the CCD element 31 employed in the image-pickup device 3. The image processing circuit 42 carries out an in-focus determination process based on an image signal obtained from a near-infrared CCD element 75 employed in the marker image-pickup device 7. Specifically, the marker light source 61 employed in the marker projection device 6 is an LED of the GaAs group emitting a near-infrared light, and the near-infrared CCD element 75 employed in the marker image-pickup device 7 is sensitive only to a near-infrared light but not sensitivity to lights in the visible wavelength band. On the contrary, the CCD element 31 employed in the image pickup device 3 is not sensitive to a near-infrared light but sensitivity only to lights in the visible wavelength band.

Thus, since the CCD element 31 employed in the marker projection device 6 projects an optical marker in a wavelength band outside the imaging wavelength band of the image-pickup device 3, the optical marker is not sensed by the image-pickup device 3, causing no optical marker to be photographed on an image brought to a focus. On the other hand, the near-infrared CCD element 75 employed in the marker image-pickup device 7 is sensitive to the wavelength band of an optical marker projected by a near-infrared light. Thus, by studying the degree of blurring of an optical marker photographed by the near-infrared CCD element 75 employed in the marker image-pickup device 7, an in-focus determination process can be carried out.

As described above, the total-focus imaging apparatus implemented by this modified version eliminates the optical filter 74 to give a simpler configuration but yet exhibits the same effect as the sixth embodiment. Thus, this modified version exhibits an effect of a reduced size and a lowered cost in comparison with the sixth embodiment.

It should be noted that another modified version of this embodiment can be built to implement a total-focus imaging apparatus which has a coated half mirror 73 to reflect only a beam with a specific wavelength and exhibits the same effect as that of the first modified version.

(Modification)

The total-focus imaging apparatus implemented by this embodiment can be modified in the same ways as the fifth embodiment is changed to the variety of embodiments thereof to give characteristics according to their respective configurations.

The present invention having been described above should not be limited to the above embodiments and modifications, but may be implemented in many other ways without departing from the spirit of the invention.

What is claimed is:

1. A total-focus imaging apparatus comprising:
    a variable-focus lens with a variable focal position for an object of observation;
    an actuator for changing the focal position of the variable-focus lens;
    driving means for driving the actuator;
    an image-pickup device for outputting real image formed by the variable-focus lens as an image signal of each pixel;
    an image memory for storing image signals for a plurality of images with focal positions different from each other;
    an image processing circuit for determining an image signal most brought to a focus among the images for each pixel and extracting each determined image signal, and then generating at least one of an image with all portions of the observation object brought to a focus and a stereo numerical model showing a stereo shape of the observation object; and
    a control circuit for synchronously controlling at least the driving means, the image-pickup device and the image memory,
    wherein a pixel brought to a focus is determined by the image processing circuit by detecting a polarity inversion of differences in pixel luminance of each pixel between focal positions.

2. A total-focus imaging apparatus according to claim 1, wherein, in case a plurality of polarity inversions exist, a pixel brought to a focus is determined by the image processing circuit by detecting the polarity inversion by selecting either one of polarity inversions indicating a maximum luminance value or a polarity inversion indicating a minimum luminance value and, in case there exists a plurality of polarity inversions indicating either a maximum luminance value or a minimum luminance value, a polarity inversion indicating a sharpest inversion is selected for determination of a pixel brought to a focus.

3. A total-focus imaging apparatus comprising:
    a variable-focus lens with a variable focal position for an object of observation;
    an actuator for changing the focal position of the variable-focus lens;
    driving means for driving the actuator;
    an image-pickup device for outputting real image formed by the variable-focus lens as an image signal of each pixel;
    an image memory for storing the image signals for a plurality of images with focal positions different from each other;
    an image processing circuit for determining an image signal most brought to a focus among the images for each pixel and extracting each determined image signal, and then generating at least either an image with all portions of the observation object brought to a focus or a stereo numerical model showing a stereo shape of the observation object; and
    a control circuit for synchronously controlling at least the driving means, the image-pickup device and the image memory,
    wherein a pixel brought to a focus is determined by the image processing circuit by using a maximum of absolute values of differences in pixel luminance of each pixel between focal positions as a criterion.

4. A total-focus imaging apparatus comprising:
    a variable-focus lens with a variable focal position for an object of observation;
    an actuator for changing the focal position of the variable-focus lens;
    driving means for driving the actuator;
    an image-pickup device for outputting real image formed by the variable-focus lens as an image signal of each pixel;
    an image memory for storing the image signals for a plurality of images with focal positions different from each other;
    an image processing circuit for determining an image signal most brought to a focus among the images for each pixel and extracting each determined image signal, and then generating at least either an image with all portions of the observation object brought to a focus or a stereo numerical model showing a stereo shape of the observation object; and
    a control circuit for synchronously controlling the driving means, the image-pickup device and the image memory,
    wherein a specific pixel brought to a focus is determined by the image processing circuit by detecting a minimum of entropy values of image segments of the images at the focal positions where an image segment is a portion of an image including the specific pixel and pixels surrounding the specific pixel.

5. A total-focus imaging apparatus comprising:

a variable-focus lens with a variable focal position for an object of observation;

an actuator for changing the focal position of the variable-focus lens;

driving means for driving the actuator;

an image-pickup device for outputting real image formed by the variable-focus lens as an image signal of each pixel;

an image memory, for storing the image signals for a plurality of images with focal positions different from each other;

an image processing circuit for determining an image signal most brought to a focus among the images for each pixel and extracting each determined image signal, and then generating at least either an image with all portions of the observation object brought to a focus or a stereo numerical model showing a stereo shape of the observation object; and a control circuit for synchronously controlling the driving means, the image-pickup device and the image memory, wherein a specific pixel brought to a focus is determined by the image processing circuit by applying different determination methods to one of an image segment including the specific pixel and an image segment including a plurality of pixels.

6. A total-focus imaging apparatus comprising:

a variable-focus lens with a variable focal position for an object of observation;

an actuator for changing the focal position of the variable-focus lens;

driving means for driving the actuator;

an image-pickup device for outputting real image formed by the variable-focus lens as an image signal of each pixel;

an image memory, for storing the image signals for a plurality of images with focal positions different from each other;

an image processing circuit for determining an image signal most brought to a focus among the images for each pixel and extracting each determined image signal, and then generating at least either an image with all portions of the observation object brought to a focus or a stereo numerical model showing a stereo shape of the observation object; and a control circuit for synchronously controlling the driving means the image-pickup device and the image memory, wherein a specific pixel brought to a focus is determined by the image processing by executing a first stage of determining an in-focus state for a specific image segment including a pixel or a plurality of pixels and determining an in-focus state for a plurality of image segments surrounding the specific image segment, and a second stage of determining an in-focus state anew by determining an in-focus state for a large image segment comprising the specific image segment and the image segments surrounding the specific image segment.

7. A total-focus imaging apparatus comprising:

a variable-focus lens with a variable focal position for an object of observation;

an actuator for changing the focal position of the variable-focus lens;

driving means for driving the actuator;

an image-pickup device for outputting real image formed by the variable-focus lens as an image signal of each pixel;

an image memory for storing the image signals for a plurality of images with focal positions different from each other;

an image processing circuit for determining an image signal most brought to a focus among the images for each pixel and extracting each determined image signal, and then generating at least either an image with all portions of the observation object brought to a focus or a stereo numerical model showing a stereo shape of the observation object; and a control circuit for synchronously controlling the driving means, the image-pickup device and the image memory, wherein the variable-focus lens is a sealed liquid lens having a transparent elastic film with curvature changeable by a difference between pressures applied to front and rear surfaces thereof and transparent liquid sealed in an internal space enclosed by the transparent elastic film, the actuator is a piezoelectric actuator implemented by a piezoelectric device, the sealed liquid lens and the piezoelectric actuator are assembled with each other to form a variable-focus lens unit;

the driving means is a variable-focus lens driving circuit for applying a driving voltage to the piezoelectric actuator, the image-pickup device is a solid-state image-pickup device, the image processing circuit determines an in-focus state of a pixel in real-time manner and the control circuit generates said image brought to a focus by updating these pixels each brought to a focus from time to time.

8. A total-focus imaging apparatus comprising:

a variable-focus lens with a variable focal position for an object of observation;

an actuator for changing the focal position of the variable-focus lens;

driving means for driving the actuator;

an image-pickup device for outputting real image formed by the variable-focus lens as an image signal of each pixel;

an image memory for storing the image signals for a plurality of images with focal positions different from each other;

an image processing circuit for determining an image signal most brought to a focus among the images for each pixel and extracting each determined image signal, and then generating at least either an image with all portions of the observation object brought to a focus or a stereo numerical model showing a stereo shape of the observation object; and a control circuit for synchronously controlling the driving means, the image-pickup device and the image memory, wherein the variable-focus lens is a sealed liquid lens having a transparent elastic film with curvature changeable by a difference in pressure between front and rear surfaces thereof and transparent liquid sealed in an internal space enclosed by the transparent elastic film, the actuator is a piezoelectric actuator implemented by a piezoelectric device, the sealed liquid lens and the piezoelectric actuator are assembled with each other to form a variable-focus lens unit, the driving means is a variable-focus lens driving circuit for applying a driving voltage to the piezoelectric actuator, the image-pickup device is a solid-state image-pickup device, a voltage sensor is provided for measuring a voltage applied by the driving means to the piezoelectric actuator, and the image processing circuit has an in-focal position detection function for computing an in-focal position based on a measured value obtained from the voltage sensor.

9. A total-focus imaging apparatus comprising:

a variable-focus lens with a variable focal position for an object of observation;

an actuator for changing the focal position of the variable-focus lens;

driving means for driving the actuator;

an image-pickup device for outputting real image formed by the variable-focus lens as an image signal of each pixel;

an image memory for storing the image signals for a plurality of images with focal positions different from each other;

an image processing circuit for determining an image signal most brought to a focus among the images for each pixel and extracting each determined image signal, and then generating at least either an image with all portions of the observation object brought to a focus or a stereo numerical model showing a stereo shape of the observation object; and a control circuit for synchronously controlling the driving means, the image-pickup device and the image memory, wherein the variable-focus lens is a sealed liquid lens having a transparent elastic film with curvature changeable by a difference in pressure between front and rear surfaces thereof and transparent liquid sealed in an internal space enclosed by the transparent elastic film, the actuator is a piezoelectric actuator implemented by a piezoelectric device, the sealed liquid lens and the piezoelectric actuator are assembled with each other to form a variable-focus lens unit, the driving means is a variable-focus lens driving circuit for applying a driving voltage to the piezoelectric actuator, the image-pickup device is a solid-state image-pickup device, an electric-charge-amount sensor is provided for measuring the amount of electric charge charged and discharged to the piezoelectric actuator, and the image processing circuit has an in-focal position detection function for computing an in-focal position based on a measured value obtained from the electric-charge-amount sensor.

10. A total-focus imaging apparatus comprising:

a variable-focus lens with a variable focal position for an object of observation;

an actuator for changing the focal position of the variable-focus lens;

driving means for driving the actuator;

an image-pickup device for outputting real image formed by the variable-focus lens as an image signal of each pixel;

an image memory for storing the image signals for a plurality of images with focal positions different from each other;

an image processing circuit for determining an image signal most brought to a focus among the images for each pixel and extracting each determined image signal, and then generating at least either an image with all portions of the observation object brought to a focus or a stereo numerical model showing a stereo shape of the observation object; and a control circuit for synchronously controlling the driving means, the image-pickup device and the image memory, wherein the variable-focus lens is a sealed liquid lens having a transparent elastic film with curvature changeable by a difference in pressure between front and rear surfaces thereof and transparent liquid sealed in an internal space enclosed by the transparent elastic film, the actuator is a piezoelectric actuator implemented by a piezoelectric device, the sealed liquid lens and the piezoelectric actuator assembled with each other to form a variable-focus lens unit, the driving means is a variable-focus lens driving circuit for applying a driving voltage to the piezoelectric actuator, the image-pickup device is a solid-state image-pickup device, a displacement sensor is provided for measuring the displacement of the piezoelectric actuator, and the image processing circuit has an in-focal position detection function for computing an in-focal position based on a measured value obtained from the displacement sensor.

11. A total-focus imaging apparatus comprising:

a variable-focus lens with a variable focal position for an object of observation;

an actuator for changing the focal position of the variable-focus lens;

driving means for driving the actuator;

an image-pickup device for outputting real image formed by the variable-focus lens as an image signal of each pixel;

the image memory, for storing the image signals for a plurality of images with focal positions different from each other;

an image processing circuit for determining an image signal most brought to a focus among the images for each pixel and extracting each determined image signal, and then generating at least either an image with all portions of the observation object brought to a focus or a stereo numerical model showing a stereo shape of the observation object; and a control circuit for synchronously controlling the driving means, the image-pickup device and the image memory, wherein the image processing circuit has an in-focal position detection function for computing an in-focal position based on a signal supplied by the control circuit to the driving means.

12. A total-focus imaging apparatus comprising:

a variable-focus lens with a variable focal position for an object of observation;

an actuator for changing the focal position of the variable-focus lens;

driving means for driving the actuator;

an image-pickup device for outputting real image formed by the variable-focus lens as an image signal of each pixel;

an image memory for storing the image signals for a plurality of images with focal positions different from each other;

an image processing circuit for determining an image signal most brought to a focus among the images for each pixel and extracting each determined image signal, and then generating at least either an image with all portions of the observation object brought to a focus or a stereo numerical model showing a stereo shape of the observation object; and a control circuit for synchronously controlling the driving means, the image-pickup device, and the image memory, wherein the image memory is a line memory for storing an image signal as an image segment having a line shape having an array of pixels.

13. A total-focus imaging apparatus comprising:

a variable-focus lens with a variable focal position for an object of observation;

an actuator for changing the focal position of the variable-focus lens;

driving means for driving the actuator;

an image-pickup device for outputting real image formed by the variable-focus lens as an image signal of each pixel;

an image memory for storing the image signals for a plurality of images with focal positions different from each other;

an image processing circuit for determining an image signal most brought to a focus among the images for each pixel and extracting each determined image signal, and then generating at least either an image with all portions of the observation object brought to a focus or a stereo numerical model showing a stereo shape of the observation object; and a control circuit for synchronously controlling the driving means, the image-pickup device and the image memory, wherein the image processing circuit is a digital processing circuit used for generating at least a stereo numerical model and probably an image brought to a focus, and provided with a noise elimination filter for eliminating high space frequency noise in generation of the stereo numerical model.

14. A total-focus imaging apparatus according to claim 13, wherein the noise elimination filter is a digital filter for carrying out normal transformation for once transforming the stereo numerical model into space frequency components, for filtering for eliminating high frequency components from the space frequency components, and for executing an inverse transformation for restoring the space frequency components with the high frequency components removed back to the stereo numerical model.

15. A total-focus imaging apparatus according to claim 14, wherein, as a method of the normal transformation, any one of a discrete cosine transformation method, a discrete sine transformation method, a Fourier transformation method and a high-speed Fourier transformation method is adopted.

16. A total-focus imaging apparatus according to claim 13, wherein the noise elimination filter is a digital filter for eliminating the harmonic noise by computing either a mobile average or a total average for the stereo numerical model.

17. A total-focus imaging apparatus according to claim 13, wherein the noise elimination filter is a digital filter for handling the image signals for each image segment comprising a plurality of pixels, and taking either a luminance value observed most frequently in an image segment or an average of luminance values in an image segment as a uniform value of the image signals of pixels in the image segment.

18. A total-focus imaging apparatus comprising:

a variable-focus lens with a variable focal position for an object of observation;

an actuator for changing the focal position of the variable-focus lens;

driving means for driving the actuator;

an image-pickup device for outputting real image formed by the variable-focus lens as an image signal of each pixel;

an image memory for storing the image signals for a plurality of images with focal positions different from each other;

an image processing circuit for determining an image signal most brought to a focus among the images for each pixel and extracting each determined image signal, and then generating at least either an image with all portions of the observation object brought to a focus or a stereo numerical model showing a stereo shape of the observation object; and a control circuit for synchronously controlling the driving means, the image-pickup device and the image memory, wherein the control circuit controls the other means to carry out a preview operation to take image continuously while continuously moving the position of the focus, range determination processing to determine a range of focal positions at which the object of observation exists in the course of the preview operation, and real imaging operation to move the position of the focus in the determined range in accordance with a stepwise movement pattern and to take an image while the position of the focus is in a stationary state.

19. A total-focus imaging apparatus comprising:

a variable-focus lens with a variable focal position for an object of observation;

an actuator for changing the focal position of the variable-focus lens;

driving means for driving the actuator;

an image-pickup device for outputting real image formed by the variable-focus lens as an image signal of each pixel;

an image memory for storing the image signals for a plurality of images with focal positions different from each other;

an image processing circuit for determining an image signal most brought to a focus among the images for each pixel and extracting each determined image signal, and then generating at least either an image with all portions of the observation object brought to a focus or a stereo numerical model showing a stereo shape of the observation object; and a control circuit for synchronously controlling the driving means, the image-pickup device and the image memory, wherein the control circuit controls the driving means to adjust the movement speed of the focal position in accordance with the depth of field of the focus-variable lens.

20. A total-focus imaging apparatus comprising:

a variable-focus lens with a variable focal position for an object of observation;

an actuator for changing the focal position of the variable-focus lens;

driving means for driving the actuator;

an image-pickup device for outputting real image formed by the variable-focus lens as an image signal of each pixel;

the image memory for storing the image signals for a plurality of images with focal positions different from each other;

an image processing circuit for determining an image signal most brought to a focus among the images for each pixel and extracting each determined image signal, and then generating at least either an image with all portions of the observation object brought to a focus or a stereo numerical model showing a stereo shape of the observation object;

a control circuit for synchronously controlling the driving means, the image-pickup device and the image memory; and marker projection means for at least projecting an optical marker with an image thereof formed at the position of the focus on the object of observation.

21. A total-focus imaging apparatus according to claim 20, wherein the marker projection means is capable of putting the optical marker in a blinking state, and the control circuit controls the image-pickup device and the image processing circuit synchronously with the blinking state of the optical marker to carry out an in-focus determination process during projection of the optical marker and to store the image signals in the image memory, while the optical marker is blinking.

22. A total-focus imaging apparatus according to claim 20, wherein the marker projection means is a means for projecting the optical marker in a wavelength band outside a projection wavelength band of the image-pickup device, a marker image-pickup device is provided to be sensitive to the wavelength band of the optical marker, and the image processing circuit carries out an in-focus determination process based on an image signal obtained from the marker image-pickup device.

* * * * *